United States Patent
Mushtaq et al.

(10) Patent No.: US 8,117,207 B2
(45) Date of Patent: Feb. 14, 2012

(54) SYSTEM AND METHODS FOR EVALUATING FEATURE OPINIONS FOR PRODUCTS, SERVICES, AND ENTITIES

(75) Inventors: Faisal Mushtaq, Pleasanton, CA (US); Gavin Das, San Francisco, CA (US); Adnan Mohsin Habib, Tracy, CA (US)

(73) Assignee: Biz360 Inc., Palo Alto, CA (US)

( * ) Notice: Subject to any disclaimer, the term of this patent is extended or adjusted under 35 U.S.C. 154(b) by 385 days.

(21) Appl. No.: 12/106,218

(22) Filed: Apr. 18, 2008

(65) Prior Publication Data

US 2009/0265332 A1    Oct. 22, 2009

(51) Int. Cl.
    *G06F 17/30*     (2006.01)
(52) U.S. Cl. ........ 707/748; 707/752; 707/755; 707/805; 705/1.1; 705/14.44
(58) Field of Classification Search .................. 707/602, 707/748, 752, 755, 805; 705/1.1, 14.44
See application file for complete search history.

(56) References Cited

U.S. PATENT DOCUMENTS

| | | | |
|---|---|---|---|
| 7,836,001 B2 * | 11/2010 | Ducheneaut et al. | 706/45 |
| 2002/0065802 A1 * | 5/2002 | Uchiyama | 707/1 |
| 2005/0091038 A1 * | 4/2005 | Yi et al. | 704/10 |
| 2007/0016563 A1 * | 1/2007 | Omoigui | 707/3 |
| 2007/0078670 A1 * | 4/2007 | Dave et al. | 705/1 |

\* cited by examiner

*Primary Examiner* — Frantz Coby
(74) *Attorney, Agent, or Firm* — Sheppard, Mullin, Richter & Hampton, LLP

(57) ABSTRACT

A system for evaluating a review having unstructured text comprises a segment splitter for separating at least a portion of the unstructured text into one or more segments, each segment comprising one or more words; a segment parser coupled to the segment splitter for assigning one or more lexical categories to one or more of the one or more words of each segment; an information extractor coupled to the segment parser for identifying a feature word and an opinion word contained in the one or more segments; and a sentiment rating engine coupled to the information extractor for calculating an opinion score based upon an opinion grouping, the opinion grouping including at least the feature word and the opinion word identified by the information extractor.

20 Claims, 20 Drawing Sheets

(Scraper)

(Example System)

(Part 1)

(Part 2)

SYSTEM AND METHODS FOR EVALUATING FEATURE OPINIONS FOR PRODUCTS, SERVICES, AND ENTITIES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to marketing, customer service and product development, and more particularly provides a system and method for evaluating and presenting product, service, entity and/or feature opinions.

BACKGROUND

Collecting end-user opinions on products, services, entities and/or features is an important way to inform a company of end-user satisfaction and improvement needs. Armed with end-user opinions, a company can achieve greater market penetration and develop future improvements.

Traditionally, product manufacturers and/or service providers provide paper surveys and/or contact users directly to request end-user opinions. These surveys often ask why a user purchased a product and/or service and about the user's initial opinions of the product, service, entity and/or features of the product and/or service. However, most end-users never complete the survey request or take the time to respond to the telephone inquiry.

With the development of online sales, much end-user opinion collection has gone online. Some companies provide online electronic surveys requesting end-user opinions. Electronic surveys are more convenient than paper surveys and less invasive than telephone calls. Although more users are willing to complete the electronic surveys, the significant majority of users still do not fill them out.

Websites unrelated to the original manufacturer and/or service provider have been developed that allow users to rate and review products, services, entities and/or features. Examples of such websites include Amazon.com and Edmunds.com. Users can navigate to a page corresponding to a particular product and/or service, and can rate the product, service, entity and/or features of the product and/or service. Other websites that provide end-user opinions of products, services, entities and/or features include blogs, message boards, auction sites, consumer review sites, expert sites, traditional media sites, etc. Accordingly, after a user has had an opportunity to evaluate a product and/or service, the user may be motivated to publish his or her opinions regarding the product, service, entity and/or features.

Accordingly, a company can read the comments of paper and electronic surveys received and read the published opinions corresponding to each of their products and/or services and to each of their competitor's products and/or services. Thus, the company can educate itself as to end-user opinions, how their products and/or services compare to their competitor's products and/or services, what features are liked or disliked, and what features may be desirable for future products, entities and/or services. However, mining for end-user opinions is a time consuming task.

FIG. 1 is a block diagram of an example company 10. The example company 10 includes several entities at various positions in the corporate hierarchy. The example company 10 may include a CEO 100 who manages entities such as marketing 105, customer service 110, and engineering and product development 1115. Marketing 105 may include additional entities such as public relations, communications and sales 120; customer lead generation 125; and customer need generation 130. Each of these entities may find the end-user opinions valuable. Accordingly, a system and method to assist with end-user opinion mining would be helpful.

SUMMARY

In accordance with one embodiment, the present invention provides a system for evaluating a review having unstructured text, the system comprising a segment splitter for separating at least a portion of the unstructured text into one or more segments, each segment comprising one or more words; a segment parser coupled to the segment splitter for assigning one or more lexical categories to one or more of the one or more words of each segment; an information extractor coupled to the segment parser for identifying a feature word and an opinion word contained in the one or more segments; and a sentiment rating engine coupled to the information extractor for calculating an opinion score based upon an opinion grouping, the opinion grouping including at least the feature word and the opinion word identified by the information extractor.

The system may further comprise a language engine coupled to the segment parser for providing the segment parser with data linking the one or more words of each segment to the lexical categories to which the one or more words are customarily assigned in a dictionary. The information extractor may be configured to identify rating modifiers contained in the one or more segments. The system may further comprise a training model coupled to the information extractor for providing the information extractor with a set of sample segments and corresponding trained structures to assist in identifying feature words and opinion words. The system may further comprise a nonsense analyzer coupled to the sentiment rating engine for determining whether the opinion grouping likely expresses a valid opinion. The nonsense analyzer may be configured to determine whether the opinion grouping duplicates an earlier opinion grouping. The system may further comprise a modifier tool coupled to the sentiment rating engine for assigning word scores to the feature word and the opinion word contained in the opinion grouping. The system may further comprise an opinion insight summarizer coupled to the sentiment rating engine, wherein the sentiment rating engine calculates a plurality of opinion scores based upon a plurality of opinion groupings; and the opinion insight summarizer aggregates the plurality of opinion scores into one or more advocacy scores. The system may further comprise a feature/attribute management tool coupled to the opinion insight summarizer for assigning a relative weight to each of the plurality of opinion scores. The system may further comprise a presentation engine coupled to the opinion insight summarizer for presenting the one or more advocacy scores to a user on an output device.

In accordance with another embodiment, the present invention provides a method for evaluating a review having unstructured text, the method comprising the steps of separating at least a portion of the unstructured text into one or more segments, each segment comprising one or more words; assigning lexical categories to one or more of the one or more words of each segment; identifying a feature word and an opinion word contained in the one or more segments; and calculating an opinion score based upon an opinion grouping, the opinion grouping including the feature word and the opinion word.

The step of assigning lexical categories may further comprise the step of providing data linking the one or more words of each segment to the lexical categories to which the one or more words are customarily assigned in a dictionary. The step of identifying a feature word and an opinion word may further comprise the step of identifying rating modifiers contained in the one or more segments. The step of identifying a feature word and an opinion word may further comprise the step of providing a set of sample segments and corresponding trained structures to assist in identifying the feature word and the opinion word. The step of calculating an opinion score may further comprise the step of determining whether the opinion grouping likely expresses a valid opinion. The step of calculating an opinion score may further comprise the step of determining whether the opinion grouping duplicates an earlier opinion grouping. The step of calculating an opinion score may further comprise the step of assigning word scores to the feature word and the opinion word contained in the opinion grouping. The method may further comprise the steps of calculating a plurality of opinion scores based upon a plurality of opinion groupings; and aggregating the plurality of opinion scores into one or more advocacy scores. The step of aggregating the plurality of opinion scores may further comprise assigning a relative weight to each of the plurality of opinion scores. The method may further comprise the step of presenting the one or more advocacy scores to a user on an output device.

In accordance with another embodiment, the present invention provides a system for evaluating a review having structured text, the system comprising a review mapper for mapping the review to one or more of a product, service, or entity; a product mapper coupled to the review mapper for separating the structured text into one or more constituent parts; and a normalizer tool coupled to the product mapper for normalizing the one or more constituent parts to a predetermined format. The system may further comprise an operator interface coupled to the review mapper for allowing a user to manually map the review to one or more of a product, service, or entity.

In accordance with yet another embodiment, the present invention provides a method for creating a training model for a system for evaluating a review having unstructured text, the method comprising the steps of displaying a series of text segments on an output device, each text segment comprising one or more words; receiving an identification of the words in each text segment that correspond to a feature or to an opinion; and creating a set of sample text segments and corresponding trained structures based upon the identification.

DETAILED DESCRIPTION

The following description is provided to enable any person skilled in the art to make and use the invention. Various modifications to the embodiments are possible, and the generic principles defined herein may be applied to these and other embodiments and applications without departing from the spirit and scope of the invention. Thus, the invention is not intended to be limited to the embodiments and applications shown, but is to be accorded the widest scope consistent with the principles, features and teachings disclosed herein.

Figure 1:
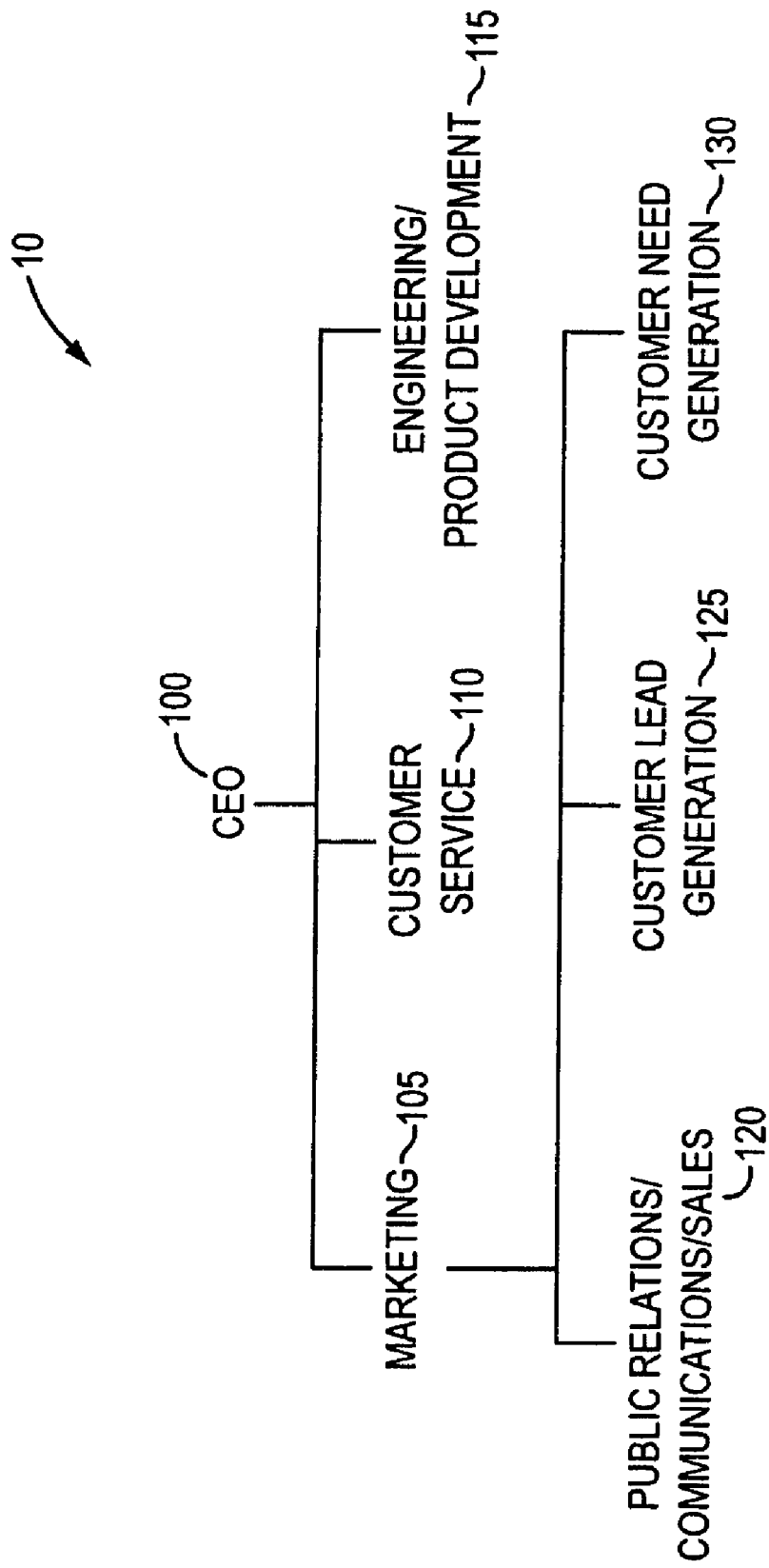
FIG. 1 is a block diagram of an example company structure in accordance with the prior art.
Figure 2:
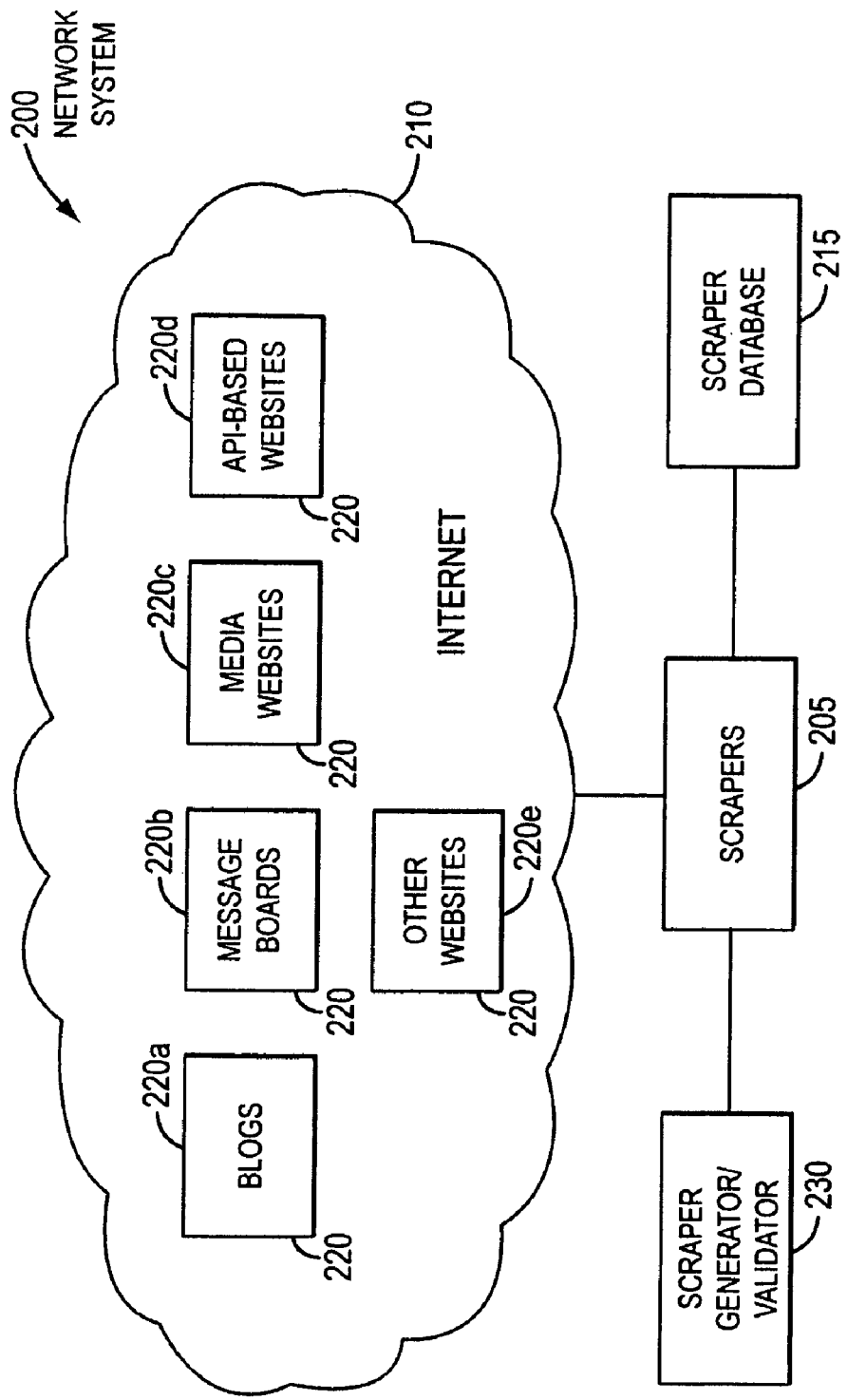
FIG. 2 is a block diagram a scraper network system, in accordance with an embodiment of the present invention.

FIG. 2 is a block diagram of a scraper network system 200, in accordance with an embodiment of the present invention. Scraper network system 200 includes scrapers 205 coupled to the wide-area network commonly referred to as the Internet 210, to a scraper database 215, and to a scraper generator/validator 230.

In one embodiment, the scrapers 205 include hardware, software and/or firmware generally operative to navigate to and map one or more websites 220 on the Internet 210, to capture content therefrom, and to store the content in the scraper database 215. Example websites 220 may include blogs 220a, message boards 220b, media websites 220c, API-based websites 220d, and other websites 220e. The scrapers 205 may be configured to navigate only to websites 220 deemed important by an operator. In one embodiment, an operator may deem a website 220 "important" if it provides end-user opinions corresponding to a category of interest. Because websites include dynamic content, a website 220 may be important at times and unimportant at other times. Example categories of interest include automobiles, computers, cell phones, hotels/casinos/resorts, patent attorneys, plumbers, and/or the like. Categories may include product types, service types, and/or any other product and/or service grouping. Content may include end-user opinions regarding a product, service, entity and/or feature.

Because of the various types of websites, content may be presented as structured data, e.g., data within fields (rating information, product identifier, etc.), data having a predetermined format (author name, date, etc.), data placed at predetermined locations (title, URL, etc.), etc. Content may be presented as unstructured data, e.g., free-form text discussion of the product, service, entity and/or features or a combination of structured and unstructured data.

In one embodiment, the scrapers 205 may include a dedicated scraper 205 for each website 205. Accordingly, each scraper 205 may be configured to navigate to, map and capture content from its corresponding website 220 only. In another embodiment, a scraper 205 may be configured to navigate to, map and capture content from websites 220 that implement a predetermined protocol, e.g., RSS feed, API version, HTML/HTTP capture, etc. Details of an example scraper 205 are provided with reference to FIG. 3.

The scraper generator/validator 230 includes hardware, software and/or firmware operative to facilitate the generation and validation of a scraper 205. In one embodiment, generation of a scraper 300 includes generation and validation of proposed scraper code. Generation of proposed scraper code includes selection of a category of interest (e.g., automobiles), identification of websites 220 corresponding to the category of interest (e.g., AutoTrader.com, Edmunds.com, Epinions.com, TheCarBlog.com, etc.), assignment of impact metrics to each website 220, evaluation of page characteristics (e.g., format, geometry, structure, etc.) of a particular website 220, and generation of proposed scraper code from the navigation pattern and page characteristics of the particular website 220. Validation of the proposed scraper code may include syntactic review, semantic checking, and a test run of the proposed scraper code. If the scraper generator/validator 230 validates the proposed scraper code, then the scraper generator/validator 230 can initiate the proposed scraper code as a scraper 205. The generation and validation process repeats for each website 220.

Figure 3:
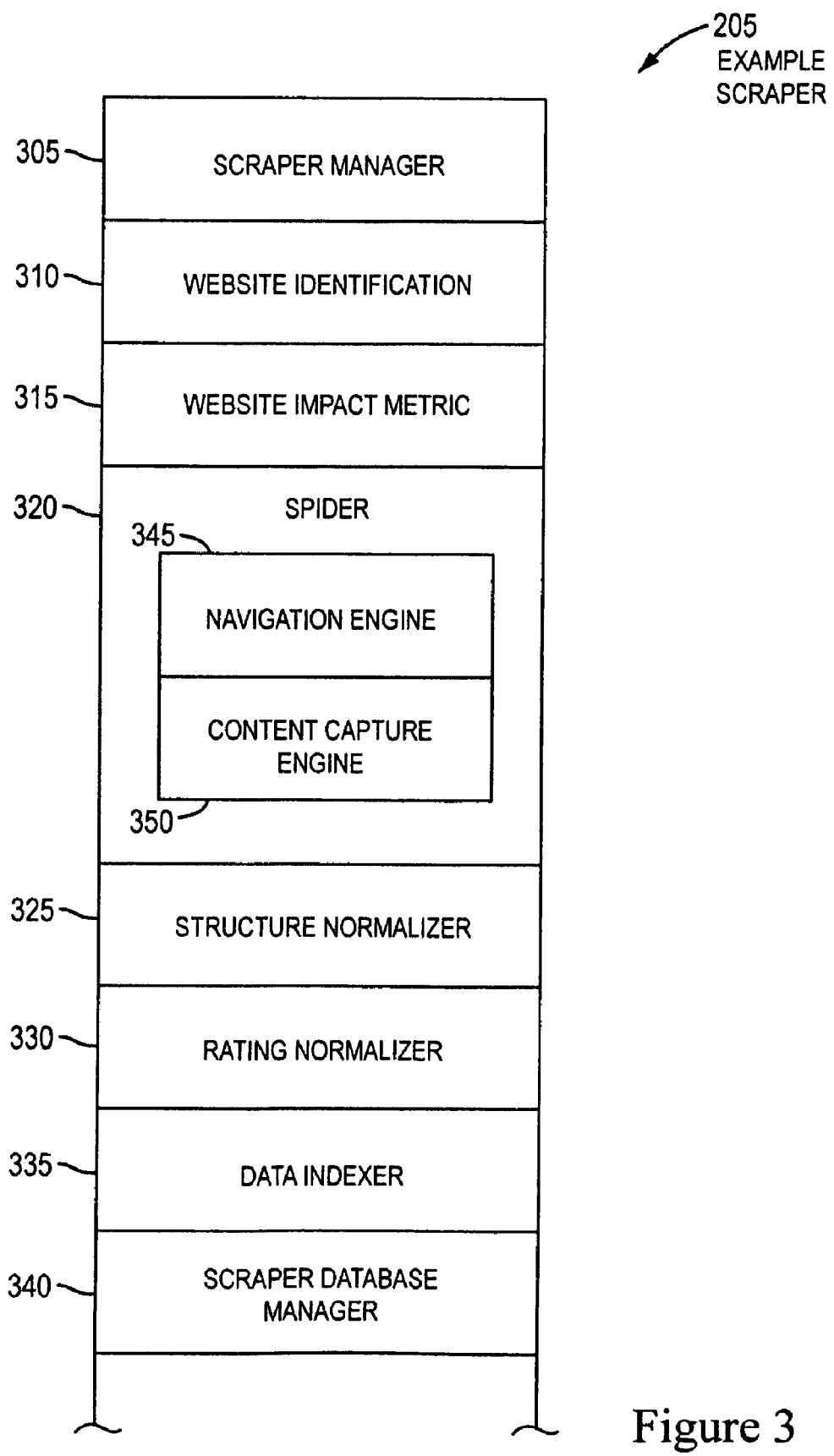
FIG. 3 is a block diagram of an example scraper, in accordance with an embodiment of the present invention.

FIG. 3 is a block diagram of an example scraper 205, in accordance with an embodiment of the present invention. Example scraper 205 includes a scraper manager 305, website identification 310, a website impact metric 315, a spider 320, a structure normalizer 325, a rating normalizer 330, a data indexer 335, and a scraper database manager 340. The example scraper 205 may be dedicated to a particular website 220 containing content corresponding to a particular category, e.g., dedicated to a message board website 220b containing content pertaining to automobiles. The example scraper 205 may be one of several scrapers 205 of a scraper group corresponding to the particular category. Further, there may be several scraper groups belonging to several categories.

The scraper manager 305 includes hardware, software and/or firmware operative to schedule content gathering from the Internet 210. The scraper manager 305 may initiate content gathering periodically (e.g., monthly, weekly, daily, etc.), at predetermined times (e.g., at 5 pm on the second Tuesday of the month), upon request (e.g., user initiation), after predetermined events (e.g., an update to one or more websites, the end of a pay period, etc.), etc. In one embodiment, the scraper manager 305 schedules content gathering based on the content type, e.g., based on whether the content is consumer blog content, consumer message board content, consumer review website content, expert blog content, expert message board content, expert review website content, etc. For example, if the content type is blog content, the scraper manager 305 may gather the data daily. If the content type is message board content, then the scraper manager 305 may gather the data weekly, e.g., after a thread of content has likely been thoroughly discussed. In one embodiment, the scraper manager 305 schedules content gathering based on its website impact metric 315. For example, if the website impact metric 315 is high, then the scraper manager 305 may gather the data daily. If the website impact metric 315 is low, then the scraper manager 305 may gather the data weekly. In one embodiment, sliding scales are possible. In yet another embodiment, the scraper manager 305 continually captures content from the various websites 220, possibly in a sequence among the websites 220 deemed important.

The website identification 310 includes the URL of the website 220.

The website impact metric 315 includes a value indicative of the importance of a website 220 as it pertains to the evaluation of end-user opinions. For example, one website 220, e.g., ConsumerReports.com, may be granted more value than one person's blog. The website impact metric 315 may be used for various purposes, such as scheduling, rating valuation, rating normalization, etc. In one embodiment, the scraper manager 305 may only scrape websites 220 that have a website impact metric over a particular level. In one embodiment, the user may select the minimum website impact metric to include in the results.

The spider 320 includes hardware, software and/or firmware operative to navigate to the website 220, to map the pages and sub-pages of the website 220, and to capture content therefrom. The spider 320 includes a navigation engine 345 and a content capture engine 350.

The navigation engine 345 is operative to navigate to the website 220 (e.g., to the homepage and/or sub-page on the website 220), and to map the "tree" structure of the website 220 before content capture. The navigation engine 345 may include a navigation mechanism to follow links on a home page or higher-level page to sub-pages containing content. For example, in one embodiment, the navigation engine 345 is operative to navigate to the home page of a particular website 220 based on the website identification 310. The navigation engine 345 may follow hyperlinks from the particular website 220 to the sub-pages. The navigation engine 345 may capture the URLs of the sub-pages containing the content to scrape. In one embodiment, the navigation engine 345 may store the URLs of the sub-pages to jump to the particular sub-pages for content capture.

The content capture engine 350 is operative to capture the content from the pages (and sub-pages) of the website 220. The content capture engine 350 may be capable of capturing data of one or more protocols, e.g., RSS feeds, API-based communication, HTML/HTTP capture, and/or other data capture protocol. The content capture engine 350 may cooperate with the navigation engine 345 to jump between sub-pages identified for content capture.

The content capture engine 350 may use content-identification mechanisms (e.g., content-location on a sub-page) and/or rules-based mechanisms (e.g., syntactic and/or semantic engines) to identify the content to capture. The content capture engine 350 may be configured to capture both structured data (such as author name, date, rating information, etc.) and unstructured data (such as free text of an end-user).

The structure normalizer 325 includes hardware, software and/or firmware operative to receive the structured data and to normalize the data to a predetermined format (such as <Last Name, First Name, Middle Initial if available>, <Month Day, Year>, etc.).

The rating normalizer 330 includes hardware, software and/or firmware operative to receive ratings information and to normalize the ratings to a predetermined scale. For example, some websites 220 may request specific rating information for a product, service, entity and/or feature. However, the scale and/or format may be different. One website 220 may grade a product, service, entity and/or feature on a 100-point scale. Another website 220 may grade a product, service, entity and/or feature on a A-F scale. Yet another website 220 may grade a product, service, entity and/or feature according to a set of descriptors, e.g., Excellent, Good, Average, Poor, etc. The rating normalizer 330 translates the rating information from the website's scale to a common scale, e.g., 1-10. In yet another embodiment, the end-user may use unstructured text to describe an opinion relative to the product, service, entity and/or feature. The rating normalizer 330 may be configured to apply semantic analysis to translate the free-form text to the common scale. For example, if the end-user states "the comfort of a car was mediocre," then the rating normalizer 330 may translate the descriptor "mediocre" to level 5 of 10.

In one embodiment, the rating normalizer 330 includes hardware, software and/or firmware to evaluate rating modifiers, such as intensifiers (e.g., "incredibly," "very" etc.) which intensify a rating, minimizers (e.g., "marginally," "kinda," "somewhat," etc.) which reduce a rating, negators (e.g., "not," "nor," "neither," etc.) that reverse a rating, and polarizers (e.g., "big cockroach" with reference to hotels, "tasty chicken" with reference to restaurants, etc.) that can affect a rating.

The rating normalizer 330 may use the presence of a rating modifier to modify rating. For example, the rating normalizer 330 may normalize the rating "excellent" as a 10/10. However, the rating normalizer 330 may treat the presence of the term "almost" as in "almost excellent" by dropping the rating by two points, in this case, to 8/10. Similarly, if the rating normalizer 330 treated the term "good" as a 6/10, the rating normalizer 330 may raise a rating by two points if it recognizes the term "very." In another embodiment, the rating normalizer 330 translates the rating/modifier combination to the predetermined scale. For example, the rating normalizer 330 may treat the combined term "not good" as a 3/10, regardless of how the rating normalizer 330 would treat the term "good."

In one embodiment, the rating normalizer 330 includes a database of polarizer/category combinations corresponding to rating values and/or rating modifiers. The rating normalizer may use a polarizer/category combination to modify the rating or cause a different translation. For example, the rating normalizer 330 may rate the language "excellent restaurant but for a big cockroach" lower than "excellent restaurant," and maybe even lower than "good restaurant." Due to the presence of a polarizer/category combination, the rating normalizer 330 may modify the rating by a certain number of points (e.g., from 10/10 to 8/10) or may translate the language directly to its predetermined scale (e.g., directly to 8/10).

The data indexer 335 includes hardware, software and/or firmware operative to index the captured content, e.g., full-text index in a similar manner as applied by convention search engines such as Yahoo! and/or Google. For example, the data indexer 335 may generate a reverse index of terms of the captured content so that the content can more easily be searched and relevant content can more easily be identified.

The scraper database manager 340 includes hardware, software and/or firmware operative to store the captured, normalized, indexed content into the scraper database 215. In one embodiment, the scraper database manager 340 may use any of a variety of protocols, including SQL.

Figure 4:
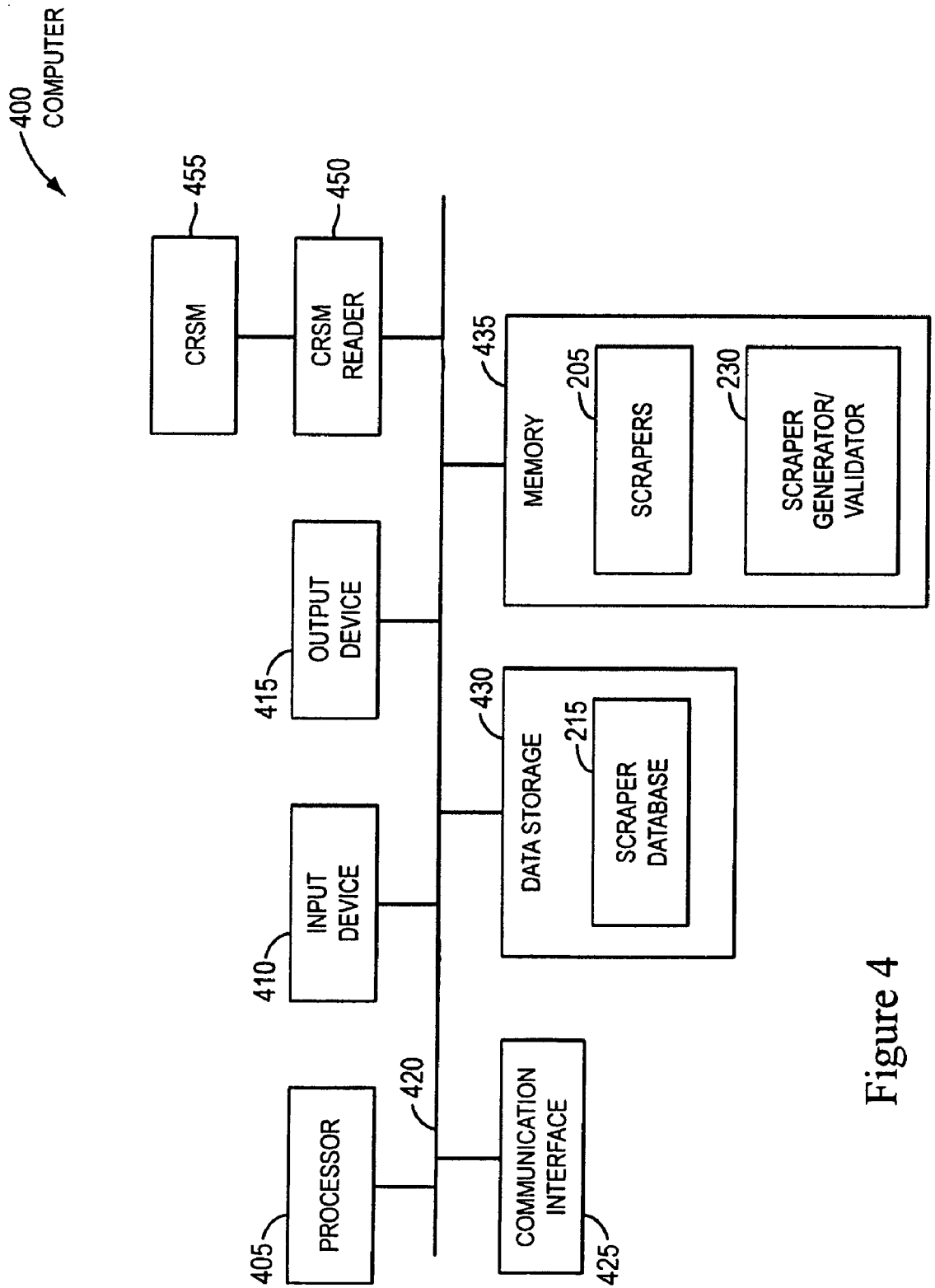
FIG. 4 is a block diagram of a scraper computer system, in accordance with an embodiment of the present invention.

FIG. 4 is a block diagram of a scraper computer system 400, in accordance with an embodiment of the present invention. Scraper computer system 400 includes a processor 405, such as an Intel Pentium® microprocessor or a Motorola Power PC® microprocessor, coupled to a communications channel 420. The scraper computer system 400 further includes an input device 410 such as a keyboard or mouse, an output device 415 such as a cathode ray tube display, a communications device 425, a data storage device 430 such as a magnetic disk, and memory 435 such as Random-Access Memory (RAM), each coupled to the communications channel 420. The communications interface 425 may be coupled to the Internet 210. One skilled in the art will recognize that, although the data storage device 430 and memory 435 are illustrated as different units, the data storage device 430 and memory 435 can be parts of the same unit, distributed units, virtual memory, etc. Further, it will be appreciated that the term "memory" herein is intended to cover all data storage media whether permanent or temporary.

As shown, the data storage device 430 stores the scraper database 215, and the memory 435 stores the scrapers 205 and the scraper generator/validator 230. The data storage device 430 and/or the memory 435 may also store an operating system (not shown) such as the Microsoft Windows XP, Linux, the IBM OS/2 operating system, the MAC OS, or UNIX operating system. It will be appreciated that one embodiment may also be implemented on platforms and operating systems other than those mentioned. An embodiment may be written using JAVA, C, and/or C++ language, or other programming languages, possibly using object oriented programming methodology.

One skilled in the art will recognize that the scraper computer system 400 may also include additional components, such as network connections, additional memory, additional processors, LANs, input/output lines for transferring information across a hardware channel, the Internet or an intranet, etc. One skilled in the art will also recognize that the programs and data may be received by and stored in the system in alternative ways. For example, a computer-readable storage medium (CRSM) reader 450 such as a magnetic disk drive, hard disk drive, magneto-optical reader, CPU, etc. may be coupled to the communications channel 420 for reading a computer-readable storage medium (CRSM) 455 such as a magnetic disk, a hard disk, a magneto-optical disk, RAM, etc. Accordingly, the scraper computer system 400 may receive programs and/or data via the CRSM reader 450.

Figure 5:
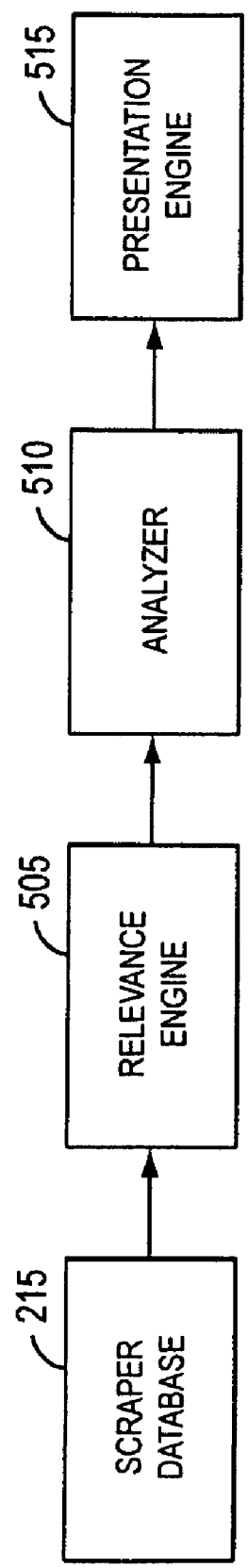
FIG. 5 is a block diagram of an example scraper context, in accordance with an embodiment of the present invention.

FIG. 5 is a block diagram of an example scraper context 500, in accordance with an embodiment of the present invention. Example scraper context 500 includes the scraper database 215, coupled to a relevance engine 505, in turn coupled to an analyzer 510, and in turn coupled to a presentation engine 515.

In one embodiment, the relevance engine 505 includes hardware, software and/or firmware operative to extract unstructured text and to use proximity, keyword matching and statistical models to map opinions to products, services, entities and/or features. The relevance engine 505 may also identify opinions unmappable to products, services, entities and/or features. The relevance engine 505 may conduct a similar analysis on structured text.

In one embodiment, the analyzer 510 includes hardware, software and/or firmware operative to decompose blocks of text, e.g., sentences, of the unstructured mapped text into language structures, and to determine candidate product/service/feature-opinion pairs ("Toyota Prius"—"Excellent"; "gas mileage in Toyota Prius"—"Excellent"; "seat size in Lexus"—"Excellent"; "gas mileage in Lexus"—"Mediocre"). In one embodiment, the analyzer 510 may be configured to ignore absurd or unsophisticated sentiments, e.g., "the car is salty." Accordingly, a predetermined dictionary of products, services and features corresponding to appropriate terms may be used.

The analyzer 510 may abstract attributes based on feature opinions. It will be appreciated that the term "attribute" may be used to identify a broad feature (e.g., comfort, etc.) that involves multiple specific features (e.g., seat size, lumbar support, cabin height, etc.). Thus, the analyzer 510 may abstract comments about seat size (a feature) and lumbar support (another feature) to determine overall comfort (an attribute). The analyzer 510 may be configured to aggregate sentiments per product/service, per feature, per time period, per brand, etc.

Figure 6:
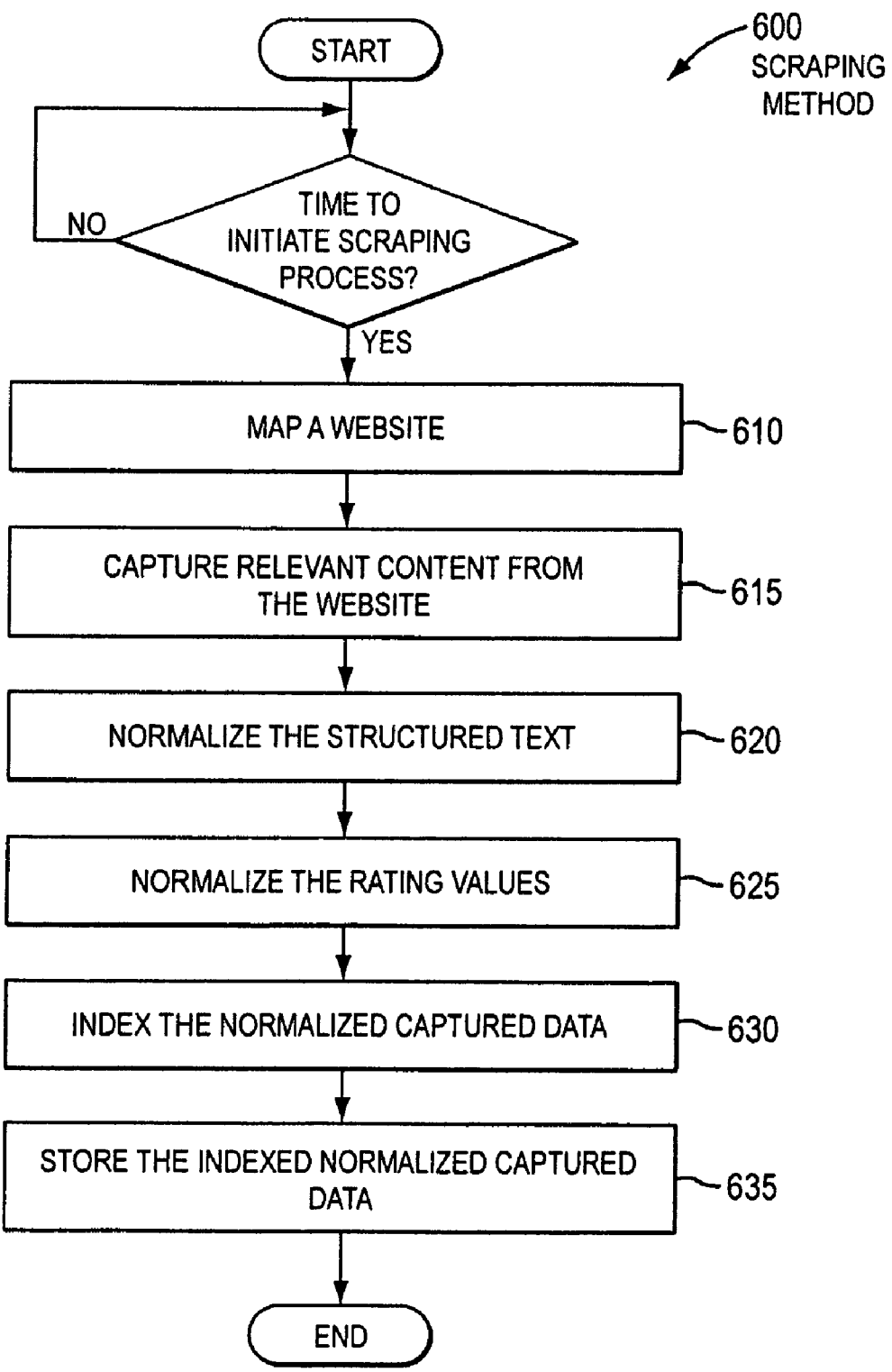
FIG. 6 is a flowchart of a method of scraping, in accordance with an embodiment of the present invention.

FIG. 6 is a flowchart of a method 600 of scraping, in accordance with an embodiment of the present invention. Method 600 begins with the scraper manager 305 in step 605 determining whether to initiate a scraping process. The scraper manager 305 may look to the expiration of a time period, the occurrence of an event, a particular date and/or time, and/or the like. The scraper manager 305 may also use the website impact metric to effect when to initiate a scraping process. If the scraper manager 305 determines that it is not time to initiate a scraping, then the method 600 returns to step 605. Otherwise, the method 600 proceeds to step 610.

In step 610, the navigation engine 345 of the spider 320 navigates to the website 220 and generates a map of the sub-pages on the website 220. The navigation engine 345 may be configured to map all pages or map only pages with predefined format or geometry. The navigation engine 345 may be configured to perform semantic and/or syntax analysis to identify pages for content capture. After the navigation engine 345 has identified pages of the website 220 for content capture, the content capture engine 350 of the spider 320 in step 615 captures the content from the website 220. The content may include structured data (e.g., title, rating information, author name, etc.) and unstructured data (e.g., free-form text that discusses a product, service, entity and/or feature). The structure normalizer 325 in step 620 normalizes the structured data, e.g., the format of the name, the format of the date, etc. The rating normalizer 330 in step 625 normalizes rating information, which may be presented as structured data, e.g., a rating value presented in a single field, and/or unstructured data, e.g., free-form text including one or more descriptors and/or intensifiers of a feature. The rating normalizer 330 may translate the structured and/or unstructured rating information to a predetermined scale, e.g., 1-10. The data indexer 335 in step 630 indexes the normalized captured content. The scraper database manager 340 in step 635 stores the indexed normalized captured content in the scraper database 215. Method 600 then ends.

Figure 7:
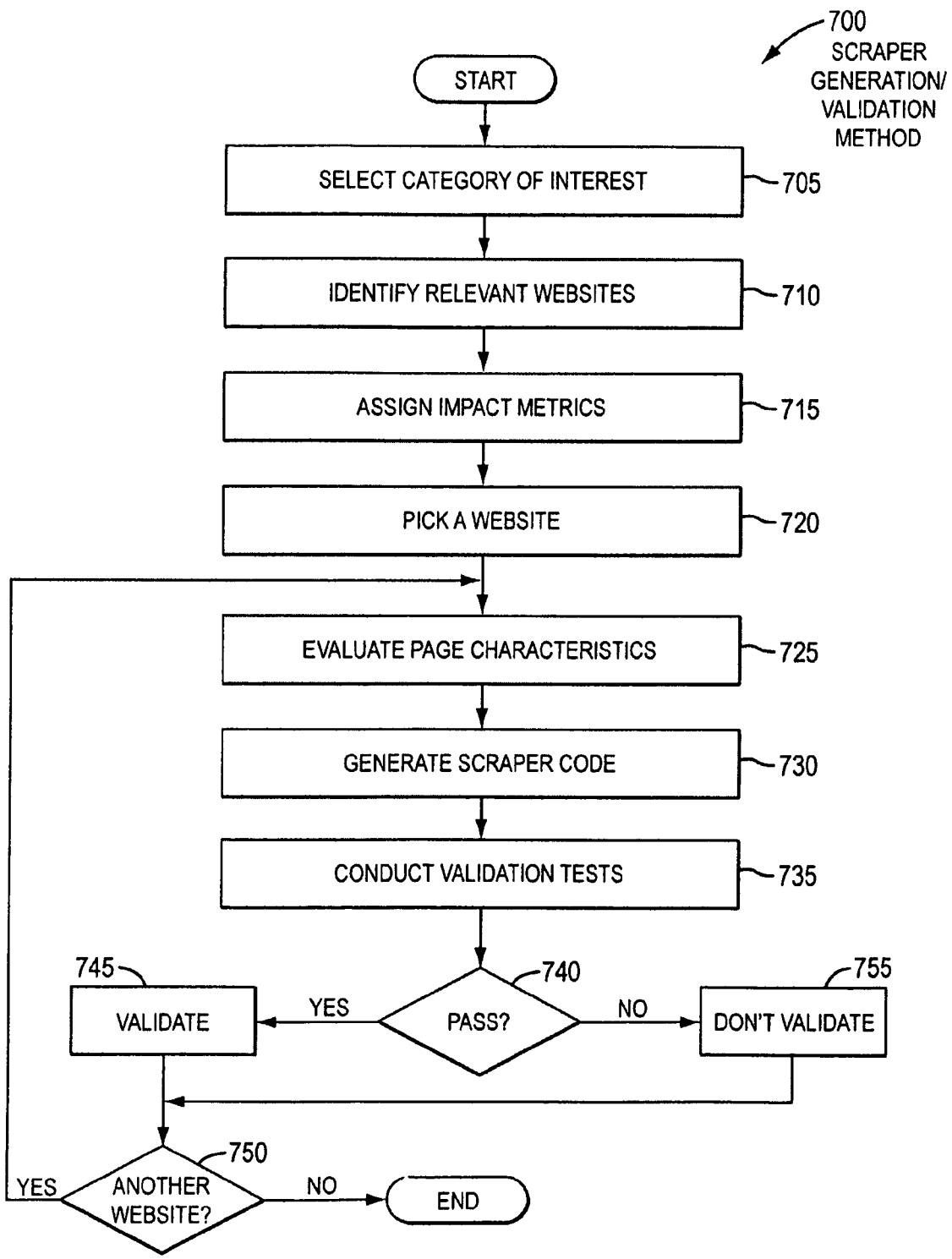
FIG. 7 is a flowchart of a method of generating/validating a scraper, in accordance with an embodiment of the present invention.

FIG. 7 is a flowchart of a method 700 of generating/validating a scraper 205, in accordance with an embodiment of the present invention. The method 700 begins with the scraper generator/validator 230 in step 705 selecting a category of interest (e.g., automobiles). The scraper generator/validator 230 in step 710 identifies websites 220 corresponding to the category of interest (AutoTrader.com, Edmunds.com, Epinions.com, TheCarBlog.com, etc.). The scraper generator/validator 230 in step 715, possibly in coordination with an operator, assigns impact metrics to each website 220.

The scraper generator/validator 230, possibly in cooperation with an operator, in step 720 identifies a website 220 and in step 725 evaluates page characteristics of various sub-pages containing content to be scraped. The scraper generator/validator 230 in step 730 generates proposed scraper code that uses the navigation patterns and/or page characteristics for the particular website 220, the proposed scraper code being operative to control content capture. The scraper generator/validator 230 in step 735 conducts validation tests, possibly including syntactic review, semantic checking, and a test run of the proposed scraper code. The scraper generator/validator 230 in step 740 determines whether the proposed scraper code passes the validation test. If the code passes, then the scraper generator/validator 230 in step 745 validates the proposed scraper code, which may include initiating the proposed scraper code as a scraper 205. The method 700 then proceeds to step 750. If the code fails, then the scraper generator/validator 230 in step 755 does not validate the code. The method 700 then proceeds to step 750.

In step 750, the scraper generator/validator 230 determines if there is another website 220 for scraper generation. If so, then method 700 returns to step 725. Otherwise, method 700 then ends.

Figure 8:
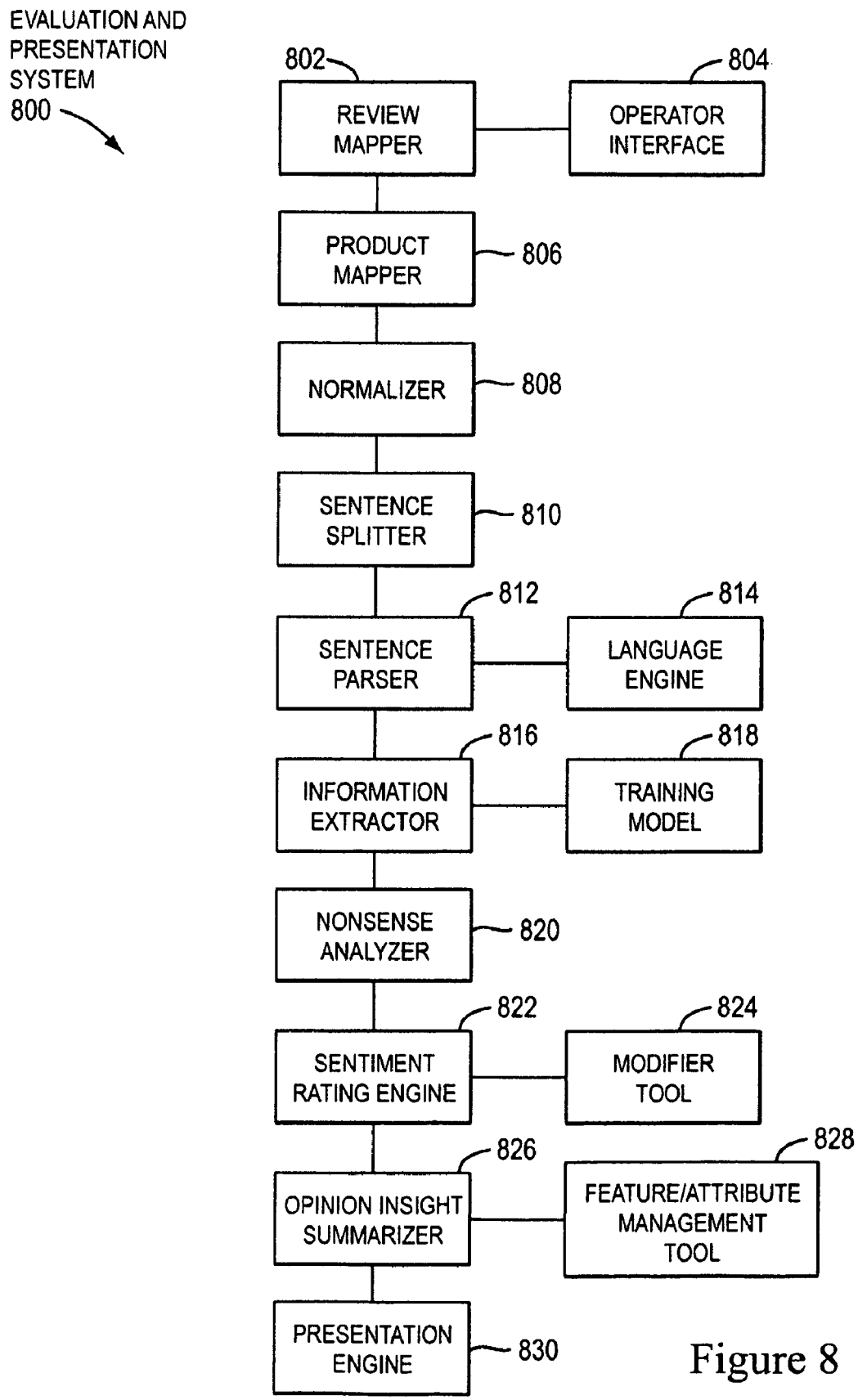
FIG. 8 is a block diagram of a system for evaluating and presenting scraped reviews, in accordance with an embodiment of the present invention.

FIG. 8 is a block diagram of a system 800 for evaluating and presenting reviews to a user, in accordance with an embodiment of the present invention. System 800 includes a review mapper 802, an operator interface 804, a product mapper 806, a normalizer 808, a sentence splitter 810, a sentence parser 812, a language engine 814, an information extractor 816, a training model 818, a nonsense analyzer 820, a sentiment rating engine 822, a modifier tool 824, an opinion insight summarizer 826, a feature management tool 828, and a presentation engine 830.

Figure 9:
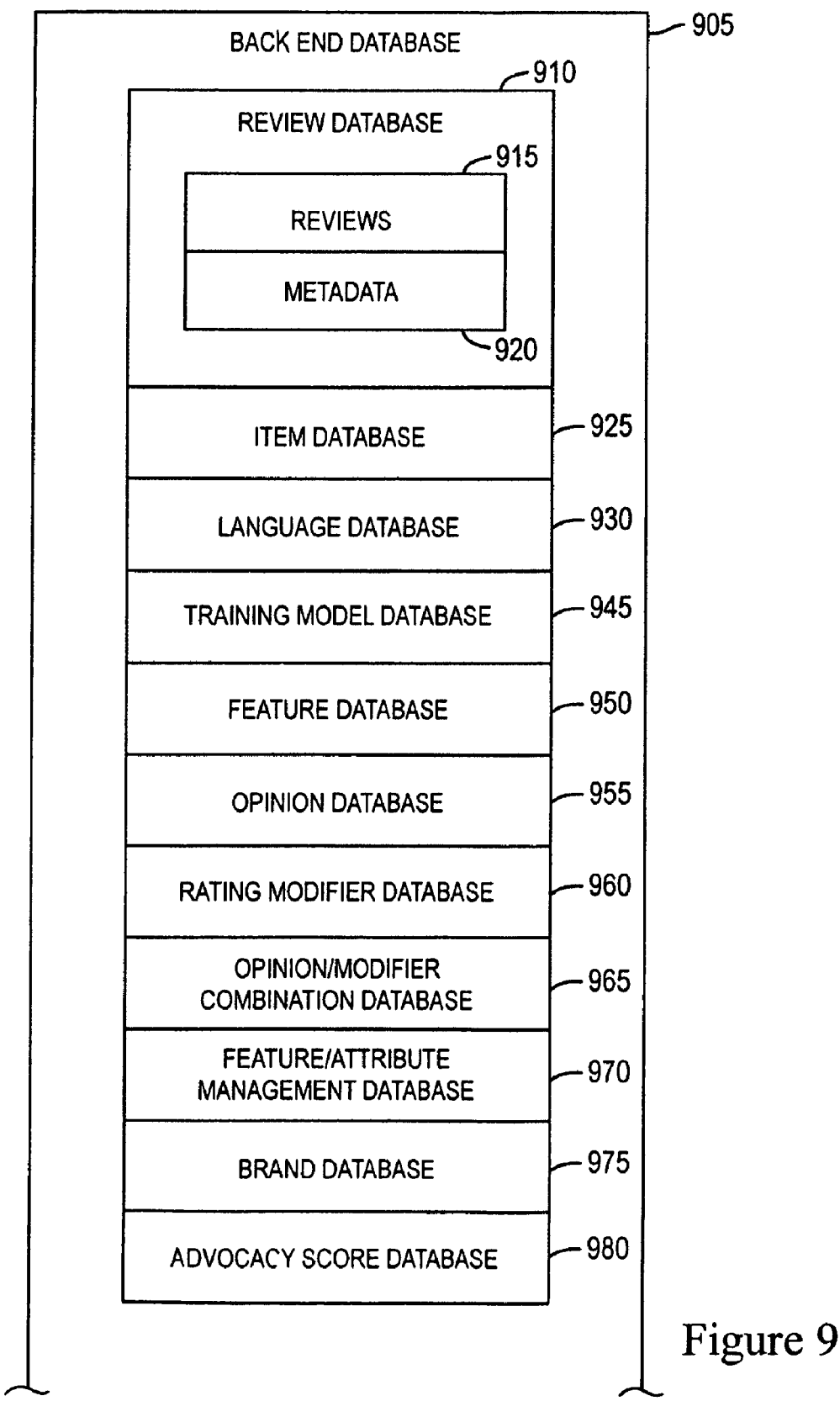
FIG. 9 is a block diagram of a back end database, in accordance with an embodiment of the present invention.

The review mapper 802 includes hardware, software and/or firmware operative to attempt to match a scraped review to a product, service, and/or feature (broadly referred to herein as an "item"). The review mapper 802 consults an item database 925 (see FIG. 9) to evaluate the scraped structured and unstructured text. In one embodiment, the review mapper 802 attempts to map the review to the lowest level of product, service or entity, e.g., a particular brand of product or service. If the review mapper 802 fails to identify the lowest level of product, service and/or entity, then the review mapper 802 attempts to match the review by working its way up the levels, e.g., by attempting to map the review to the make, the service class, the product family, and/or the like. In one embodiment, the review mapper may also try to map the review to the particular feature of a particular model of a brand of product or service, such as, engine size, tire size, speed of service, etc. The review mapper 802 may be configured to identify a product, service and/or entity using a variety of different mechanisms including word recognition, model number recognition, etc. The review mapper 802 may be able to recognize misspellings, alternative spellings, etc. Since there may be no item IDs, the review mapper 802 may use statistical models, e.g., Jacquard (or Jaccard) coefficients, to map the review to the product, service and/or entity. Since the review mapper 802 may be unable to map certain reviews, the review mapper 802 may tag the review for manual mapping.

The review mapper 802 may add the review mapping information as metadata 920 to a review database 910, which stores the reviews 915 scraped by the scraper 205. The reviews 915 may include a copy of reviews stored in scraper database 215, along with the normalized rating information and content. In one embodiment, the product database 925 and review database 910 may be stored in a back end database 905.

The operator interface 804 includes hardware, software and/or firmware operative to enable a user to add, delete or otherwise modify the metadata 920, e.g., by manually adding review mapping information to a review. The operator interface 804 may cooperate with the review mapper 802 to present item identifiers for selection and to store the item identifiers as metadata 920.

The product mapper 806 includes hardware, software and/or firmware operative to separate the structured text of the review into one or more constituent parts, a process commonly referred to as "chunking." For example, the product mapper 806 divides the review into ratings, author, website address, publication date, etc., and maps the constituent parts to known identifiers, i.e., additional metadata 920, which is stored in the review database 915.

The normalizer tool 808 includes hardware, software and/or firmware operative to receive the constituent parts created by the product mapper 806 and to normalize the constituent parts to a predetermined format, to the extent that the constituent parts are amenable to such normalization. For example, the normalizer tool 808 might normalize names according to the format <Last Name, First Name, Middle Initial if available> and dates according to the format <Month Day, Year>. After normalizing the constituent parts, the normalizer tool 808 stores the normalized constituent parts as part of the metadata 920 in the review database 915.

The sentence splitter 810 includes hardware, software and/or firmware operative to separate at least a portion of the unstructured text of a review into one or more separate sentences (or other segments), each sentence (or other segment) comprising one or more words. In one embodiment, the sentence splitter 810 is generally configured to treat punctuation marks such as periods, question marks and exclamation points in the unstructured text as sentence delimiters, and to determine when such punctuation marks are serving in a role other than as a sentence delimiter (for example, in abbreviations, URLs, numbers, etc.). The sentence splitter 810 can be configured to separate the unstructured text according to the grammar and/or punctuation rules of English or of any other language.

The sentence parser 812 includes hardware, software and/or firmware operative to receive the sentences separated by the sentence splitter 810 and to assign one or more of the words of each sentence to lexical categories or parts of speech, e.g., adjectives, adverbs, articles, conjunctions, interjections, nouns, numbers, prepositions, pronouns, quantifiers, verbs, etc. In one embodiment, the sentence parser 812 is configured to assign a word to a lexical category based upon the category to which the word is customarily assigned in a dictionary, as well as upon the relationships that the word has with adjacent and/or related words in the sentence. For example, the sentence parser 812 can recognize the word "back" as a noun in the sentence, "The back of the car is sporty," and can recognize the word "back" as a verb in the sentence, "I could not back the car into my garage." The sentence parser 812 can be configured to parse sentences written in English or any other language. An example sentence parser 812 that can be used includes the Stanford Natural Language Parser and/or the Stanford Ruby Java Bridge.

In assigning the words to lexical categories, the sentence parser 812 may consult a language engine 814. In one embodiment, the language engine 814 includes hardware, software and/or firmware operative to provide the sentence parser 812 with the lexical categories to which the words are customarily assigned in a dictionary, as well as data by which lexical categories can be determined based upon the relationships of the words with adjacent and/or related words in the sentence. To ascertain these data, the language engine 814 consults a language database 930 (see FIG. 9), which stores data linking lexical categories to words, as well as the data by which lexical categories can be determined based upon the relationships of the words with adjacent and/or related words in the sentence.

In one embodiment, the language engine 814 also supplements the normal processing of the sentence parser 812 by supplying the lexical categories of words or phrases that do not lend themselves to straightforward parsing. For example, the language engine 814 can recognize the phrase "hot tub" as a consumer product configured to hold hot water for bathers, as opposed to a tub being of a relatively high temperature. To ascertain which words or phrases that do not lend themselves to straightforward parsing, the language engine 814 consults the language database 930, which stores data identifying these words and phrases.

In one embodiment, the sentence parser 812 outputs the sentences received from the sentence splitter 810 along with sentence structures corresponding to the sentences. In one embodiment, a sentence structure is a string or other ordered sequence of lexical categories. For example, the sentence structure corresponding to the sentence, "This is not a very lousy engine," might be <pronoun, verb, negator, article, adverb, adjective, noun>. A sentence structure need not reflect a lexical category for every word in a sentence. For example, the sentence structure corresponding to the sentence, "This is not a very lousy engine," might be <X, X, negator, X, adverb, adjective, noun>.

The information extractor 816 includes hardware, software and/or firmware operative to receive the output of the sentence parser 812 and to extract certain information from the sentence parser output. In one embodiment, the information extractor 816 analyzes the output of the sentence parser 812 to determine whether the sentence parsed by the sentence parser 812 discusses a specific feature (e.g., engine, seat size, lumbar support, cabin height, etc. for a car) and, if so, what that feature is. If the information extractor 816 can identify a feature discussed by the sentence, then the information extractor 816 analyzes the output of the sentence parser 812 to determine whether the sentence offers an opinion respecting that feature (e.g., "excellent," "mediocre," "lousy," etc.). If the information extractor 816 can identify an opinion respecting the feature, then the information extractor 816 analyzes the output of the sentence parser 812 to determine whether the sentence has modified the opinion by using a rating modifier, e.g., an intensifier (e.g., "incredibly," "very," etc.), a minimizer (e.g., "marginally," "kinda." "somewhat," etc.), a negator (e.g., "not," "nor," "neither," etc.), and/or a polarizer (e.g., "big cockroach" with reference to hotels, "tasty chicken" with reference to restaurants, etc.). In one embodiment, the information extractor 816 performs these steps serially, i.e., the information extractor 816 first identifies the feature, then the opinion, and then any rating modifiers. In an alternative embodiment, the information extractor 816 performs these steps simultaneously, i.e., the information extractor 816 analyzes the structure of the sentence and identifies the feature, opinion, and any rating modifiers all at the same time.

In extracting information from the output of the sentence parser 812, the information extractor 816 may consult a training model 818. In one embodiment, the training model 818 includes hardware, software and/or firmware operative to provide the information extractor 816 with a set of sample sentence structures relevant to the category of interest. The training model 818 additionally supplies to the information extractor 816 a set of trained structures, each trained structure corresponding to one of the sample sentence structures supplied by the training model 818 to the information extractor 816. A trained structure relates one or more of the lexical categories in the corresponding sample sentence structure to one or more of a feature, an opinion, and a rating modifier. For example, the trained structure corresponding to the sample sentence structure <pronoun, verb, negator, article, adverb, adjective, noun> might relate the noun to a feature, the adjective to an opinion, the adverb to an intensifier, and the negator to a negator. In supplying data to the information extractor 816, the training model 818 consults a training model database 945, which stores the sample sentence structures, trained structures, and data relating the sample sentence structures to their corresponding trained structures.

In one embodiment, the training model 818 supplies a trained structure to the information extractor 816 as a string or other ordered sequence (e.g., <X, X, negator, X, intensifier, opinion, feature>, <negator=negator, adverb=intensifier, adjective=opinion, noun=feature>, etc.). Other arrangements and constructions for the trained structure are also possible, such arrangements and constructions being known to a person having ordinary skill in the art.

Figure 10:
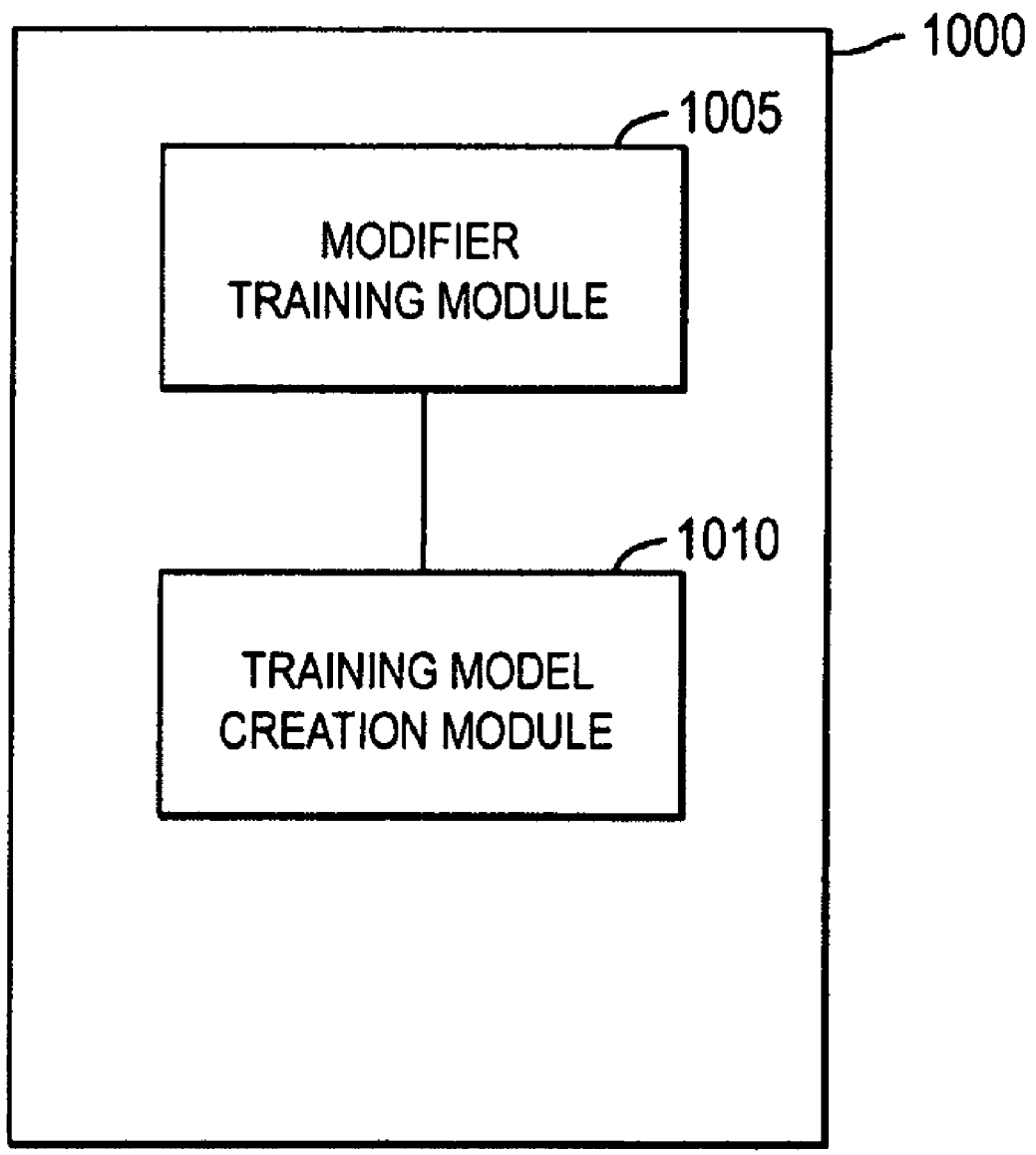
FIG. 10 is a block diagram of a system for creating a training model, in accordance with an embodiment of the present invention.

A system 1000 for creating a set of sample sentence structures and a set of corresponding trained structures for the training model 818, in accordance with an embodiment of the present invention, is shown in FIG. 10. The system 1000 includes a modifier training module 1005 and a training model creation module 1010.

The modifier training module 1005 includes hardware, software and/or firmware operative to receive a number of sentences and corresponding sentence structures from the sentence parser 812 and to display the sentences individually to a user. In one embodiment, the modifier training module 1005 individually displays four thousand sentences to the user on an output device, such as the output device 415. By using an input device such as the input device 410, the user then manually identifies the words in these sentences that correspond to features, opinions, or rating modifiers. The modifier training module 1005 is configured to receive the input from the user and to store the user input in the training model database 945.

The training model creation module 1010 includes hardware, software and/or firmware operative to access the user input from the training model database 945 and sentence structures from the sentence parser 812. Based upon the user input and sentence structures, the training model creation module 1010 creates a set of sample sentence structures and a set of corresponding trained structures for the training model 818. The training model creation module 1010 stores the sample sentence structures and corresponding trained structures in the training model database 945.

With reference to FIG. 8, the information extractor 816 receives the data supplied by the training model 818 and uses the data to correlate sentences parsed by the sentence parser 812 with the trained structures supplied by the training model 818. For example, if the sentence parser 812 parses the sentence "This is not a very lousy engine" to have the sentence structure <pronoun, verb, negator, article, adverb, adjective, noun>, then the information extractor 816 receives that sentence structure, attempts to match that sentence structure with a sample sentence structure supplied by the training model 818, and, if the information extractor 816 finds a successful match, correlates the sentence with the trained structure supplied by the training model (e.g., <X, X, negator, X, intensifier, opinion, feature>).

In attempting to match the sentence structure supplied by the sentence parser 812 with a sample sentence structure, the information extractor 816 can be configured to allow for a certain amount of variation yet still make a match. For example, the information extractor 816 can be configured to receive the sentence "I think that this is not a very lousy engine" and corresponding sentence structure <pronoun, verb, conjunction, pronoun, verb, negator, article, adverb, adjective, noun>, and allow a match with the sample sentence structure <pronoun, verb, negator, article, adverb, adjective, noun>.

After matching a sentence structure supplied by the sentence parser 812 with a sample sentence structure supplied by the training model 818, the information extractor 816 compares the sentence corresponding to the sentence structure with the trained structure corresponding to the sample sentence structure. In this way, the information extractor 816 can identify any features, opinions, and/or rating modifiers contained in the sentence. In making the comparison, the information extractor 816 assumes that a sentence having a sentence structure matching a sample sentence structure from the training model 818 has a feature, opinion, and/or rating modifier in the same or a similar order and position as the trained structure corresponding to the sample sentence structure.

In one embodiment, the information extractor 816 is configured to output an opinion grouping. An opinion grouping is a string or other ordered sequence identifying the features, opinions, and/or rating modifiers identified by the information extractor 816 (e.g., <feature=engine, opinion=lousy, intensifier=very, negator=not>). The information extractor 816 can also be configured to output data indicating that the information extractor 816 was unable to match the sentence structure supplied by the sentence parser 812 with a sample sentence structure supplied by the training model 818.

The nonsense analyzer 820 includes hardware, software and/or firmware operative to receive the output of the information extractor 816 and configured to determine which opinion groupings supplied by the information extractor likely fail to express a valid and/or relevant opinion (e.g., "The car is salty."). The nonsense analyzer 820 is configured to reject those opinion groupings.

In analyzing the opinion groupings supplied by the information extractor 816, the nonsense analyzer 820 consults a feature database 950. In one embodiment, the feature database 950 stores a list of the specific features that are relevant to the category of interest (e.g., automobiles). The nonsense analyzer 820 is configured to reject opinion groupings that pertain to features that are irrelevant to the category of interest.

In analyzing the opinion groupings supplied by the information extractor 816, the nonsense analyzer 820 also consults an opinion database 955. In one embodiment, the opinion database 955 stores lists of opinions that may validly be associated with the features stored in the feature database 950. For example, the opinion database 955 may reflect that the opinion "peppy" is validly associated with the feature "engine," but not validly associated with the feature "tires." The nonsense analyzer 820 is configured to reject opinion groupings that pertain to groupings of features and opinions that likely fail to express a valid and/or relevant opinion. This capability is customizable to support all kinds of diverse categories.

In one embodiment, the nonsense analyzer 820 is configured to determine whether an opinion grouping duplicates an earlier opinion grouping. Thus, the nonsense analyzer 820 may recognize repeat feature-opinion pairs and repeat feature-opinion-modifier groupings, and reject these pairs and groupings.

The sentiment rating engine 822 includes hardware, software and/or firmware operative to receive the opinion groupings supplied by the information extractor 816 and approved by the nonsense analyzer 820, and to calculate opinion scores based upon those opinion groupings. For example, if the information extractor 816 outputs the opinion grouping <feature=engine, opinion=mediocre, intensifier=none, negator=none>, then the sentiment rating engine 822 might compute an opinion score of 5 on a scale of 1 to 10. The sentiment rating engine 822 may compute opinion scores according to a variety of scales, including a 10-point scale, a 100-point scale, an A-F scale, a descriptive scale (e.g., Excellent, Good, Average, Poor, etc.), and/or a scale including a negative range (e.g., −3 to +3).

The modifier tool 824 includes hardware, software and/or firmware operative to assign word scores to feature words, opinion words, and/or rating modifiers, such as intensifiers, minimizers, negators and/or polarizers. In one embodiment, the modifier tool 824 is configured to supply these scores to the sentiment rating engine 822 upon receipt of a request from the sentiment rating engine for the score corresponding to a particular word or modifier. For example, the modifier tool 824 may be configured to supply the score "+2" upon receipt of a request for the score corresponding to the opinion "great," and the score "−2" upon receipt of a request for the score corresponding to the opinion "lousy." Scores corresponding to opinions are stored in the opinion database 955.

If a rating modifier is present in an opinion grouping supplied by the information extractor 816, then the sentiment rating engine 822 may modify the opinion score to reflect the rating modifier. In one embodiment, the modifier tool 824 is configured to supply a score for a particular rating modifier to the sentiment rating engine 822 upon receipt of a request from the sentiment rating engine 822 for the score. For example, the modifier tool 824 may be configured to supply a score of "1" upon receipt of a request for the score corresponding to the intensifier "very." Similarly, the modifier tool 824 may be configured to supply a score of "−1" upon receipt of a request for the score corresponding to the negator "not." Scores corresponding to rating modifiers are stored in the rating modifier database 960.

After receiving the rating modifier score from the modifier tool 824, the sentiment rating engine 822 may raise or lower the opinion score according to the rating modifier score. For example, the sentiment rating engine 822 may respond to the presence of the intensifier "very" in the opinion grouping <feature=engine, opinion=great, intensifier=very, negator=none> by raising the opinion score for the opinion "great" by 1 point (e.g., to +3). Likewise, the sentiment rating engine 822 may respond to the presence of the intensifier "very" in the opinion grouping <feature=engine, opinion=lousy, intensifier=very, negator=none> by lowering the opinion score for the opinion "lousy" by 1 point (e.g., to −3). Similarly, the sentiment rating engine 822 may respond to the presence of the negator "not" in the opinion grouping <feature=engine, opinion=lousy, intensifier=very, negator=not> by multiplying the opinion score that the opinion grouping would otherwise receive by "−1" (e.g., to +3).

In one embodiment, the modifier tool 824 is configured to supply a predetermined score for a particular opinion/modifier combination, regardless of how the modifier tool 824 would otherwise score the opinion/modifier combination. For example, the modifier tool 824 may be configured to supply the combined score "+2" upon receipt of a request for the scores corresponding to the opinion "great" and intensifier "really," even if individually the opinion "great" would normally receive an individual score of "+2" and the intensifier "really" would normally increase an individual score by "1." Scores corresponding to particular opinion/modifier combinations are stored in the opinion/modifier combination database 965.

In another embodiment, the modifier tool 824 is configured to recognize the presence of a polarizer like "big cockroach" in the restaurant category. In one embodiment, the modifier tool 823 is configured either to supply a score for the polarizer to the sentiment rating engine 822 or to instruct the sentiment rating engine 822 to override the scores for the other words in the opinion grouping, so that the polarizer score becomes the opinion score. Scores corresponding to polarizers and data regarding whether such scores should override the scores for other words may be stored in the rating modifier database 960.

The opinion insight summarizer 826 includes hardware, software and/or firmware operative to receive the opinion scores generated by the sentiment rating engine 822 and the opinion groupings supplied by the information extractor 816, and to summarize the data received for presentation to a user of the system 800. In one embodiment, the opinion insight summarizer 826 is configured to serve as an aggregation engine, calculating weighted and unweighted advocacy scores by computing the arithmetic mean or weighted arithmetic mean of the opinion scores supplied by the sentiment rating engine 822 at the product family, brand, model, attribute, and/or feature levels. Other variables for aggregating scores, e.g., opinion source, date, date range, etc. are also possible. In alternative embodiments, the opinion insight summarizer 826 can be configured to calculate a weighted or unweighted advocacy score through other statistical measures, including by calculating the mode, median, or geometric mean of the opinion scores.

The feature/attribute management tool 828 includes hardware, software and/or firmware operative to determine which features and/or attributes are relevant to the product family, brand and/or model at issue, and, if relevant, what relative weighting those features and/or attributes should receive. For example, the feature/management tool 828 may be configured to report that the feature "engine" should receive a relative weighting of "7" on a 10-point scale, that the feature "tires" should receive a relative weighting of "3" on a 10-point scale, and that the feature "hood ornament" should be ignored as irrelevant (or receive a relative weighting of "0" on a 10-point scale). Similarly, the feature/management tool 828 may be configured to report that the attribute "performance" should receive a relative weighting of "8" on a 10-point scale, while the attribute "interior design" should receive a relative weighting of "4" on a 10-point scale. Relative weightings and data regarding which features and/or attributes should be ignored as irrelevant may be stored in a feature/attribute management database 970.

In one embodiment, the feature/attribute management tool 828 also includes hardware, software and/or firmware operative to determine which attributes include which features. Data regarding which attributes comprise which features may be stored in the feature/attribute management database 970. For example, the feature/attribute database 970 may store the attribute "comfort" along with data mapping the attribute "comfort" to the features "seat size," "lumbar support," and "cabin height."

In addition to feature weighting and attribute weighting, the opinion insight summarizer 926 may additionally or alternatively weight advocacy scores by model (e.g., better selling models may be weighted higher than worse selling models when calculating an advocacy score at the brand level) and/or by opinion source (e.g., opinions scraped from ConsumerReports.com may be weighted higher than one person's blog). Data regarding brand weighting may be stored in a brand database 975. Data regarding opinion source weighting may be provided by the website impact metric 315.

Using the data supplied by the feature/attribute management tool 828, the back end database 905 and/or the website impact metric 315, the opinion insight summarizer 926 calculates weighted and unweighted advocacy scores, and stores those scores in an advocacy score database 980. In one embodiment, the opinion insight summarizer 926 calculates weighted advocacy scores at the product family, brand, model, attribute and feature levels, and stores those scores in the advocacy score database 980. The opinion insight summarizer 926 also calculates and stores weighted advocacy scores for specific opinion sources that have a website impact metric over a particular level on a continuous basis.

The presentation engine 830 includes hardware, software and/or firmware operative to access advocacy scores stored in the advocacy score database 980 and to create presentations based upon those advocacy scores to be graphically and/or textually displayed to the user of the system 800 on an output device, such as output device 415. In one embodiment, the presentation engine 830 is configured to present advocacy scores and related data in a variety of formats, including without limitation a customer advocacy trend format, a feature analyzer format, a gap assessment format, a product drill down format, and a source favorability format.

Figure 11:
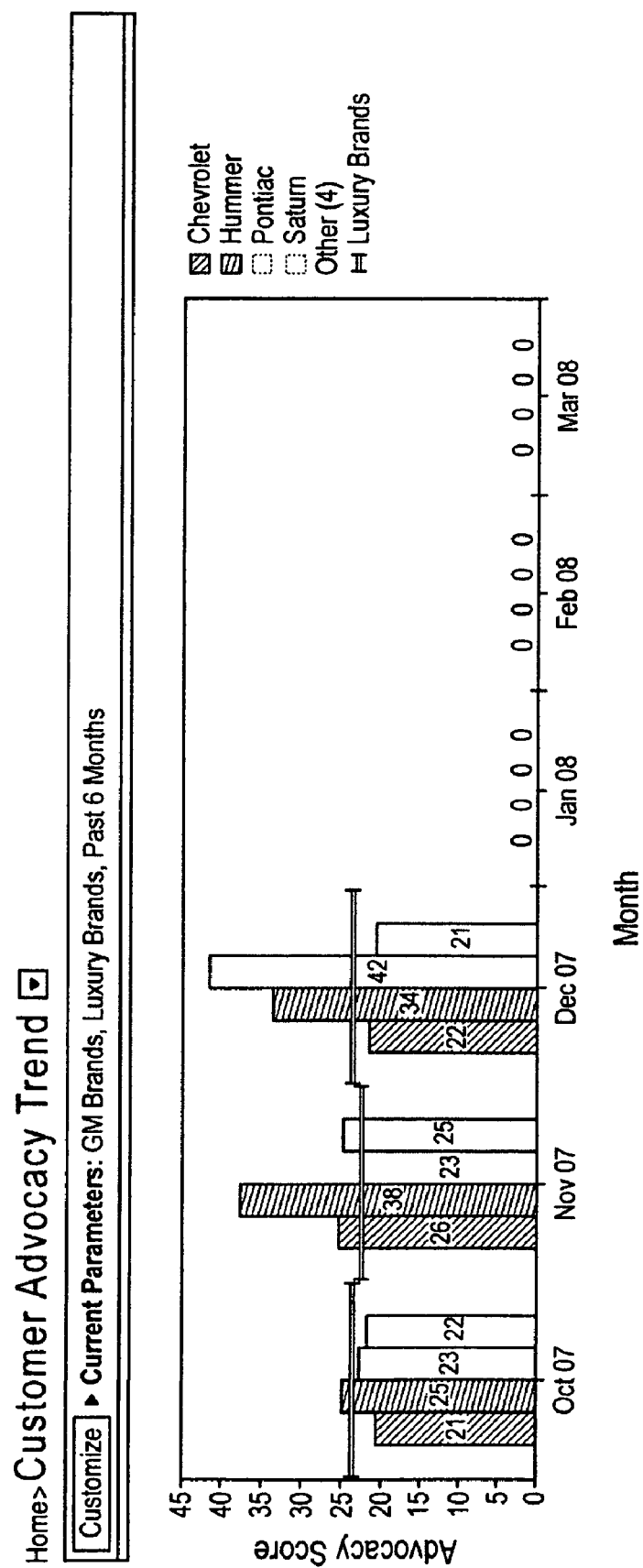
FIG. 11 is a screenshot of an example report in a customer advocacy trend format, showing advocacy scores at the brand level over time, in accordance with an embodiment of the present invention.

In one embodiment, the customer advocacy trend format provides an ongoing statistical measure of consumers' likelihood in recommending a brand, product, or service to others. A user can track advocacy score changes over time, benchmark advocacy scores against industry norms, compare advocacy scores among competitors, and identify the sources that are the biggest advocates or most vocal detractors of a brand, product or service. FIG. 11 is a screenshot of an example report in the customer advocacy trend format, showing advocacy scores at the brand level over time.

Figure 12:
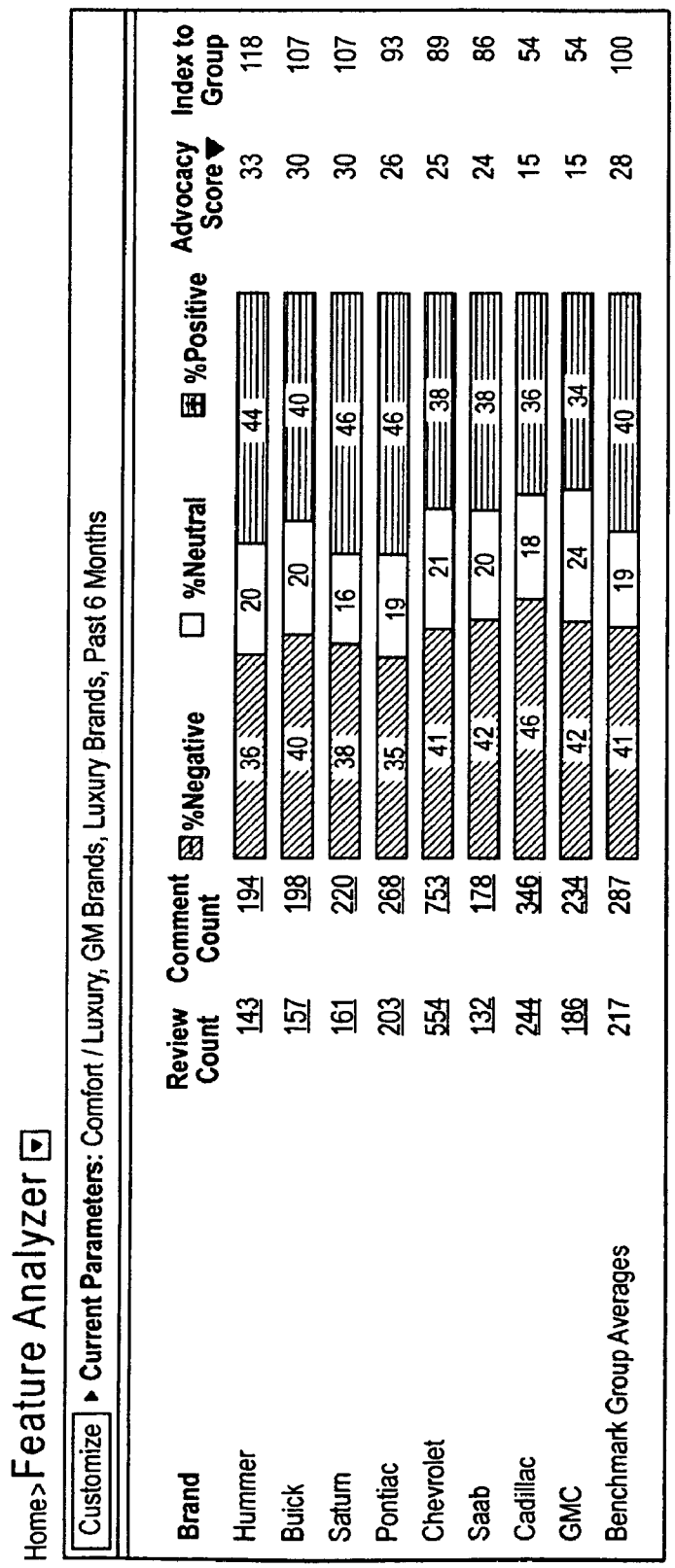
FIG. 12 is a screenshot of an example report in a feature analyzer format, showing (by brand for the comfort/luxury attribute over six months) the number of reviews; the number of individual comments; the percentage of positive, negative and neutral reviews; advocacy scores; and advocacy scores benchmarked to the index, in accordance with an embodiment of the present invention.

In one embodiment, the feature analyzer format provides the ability to drill into a specific product feature or attribute to examine the sentiment of the feature or attribute from consumers. The feature analyzer format can be used to determine what the prevailing consumer opinion is regarding the feature or attribute, identify the major sources of positive and negative opinion on the topic, compare results across competitors, and determine changes in consumer opinion over time. FIG. 12 is a screenshot of an example report in the feature analyzer format, showing (by brand for the comfort/luxury attribute over six months) the number of reviews; the number of individual comments; the percentage of positive, negative and neutral reviews; the advocacy score; and the advocacy score benchmarked to the index 100.

Figure 13:
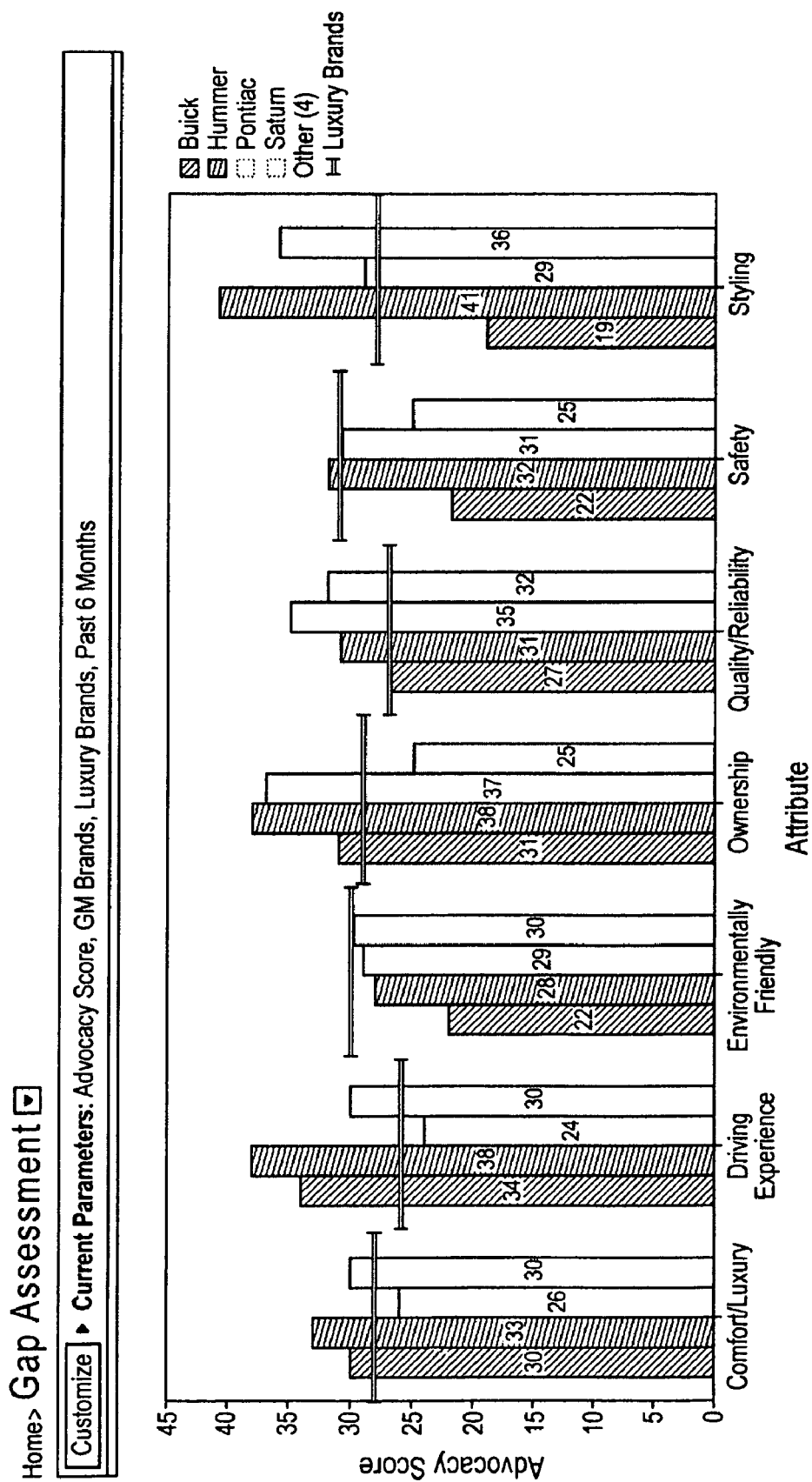
FIG. 13 is a screenshot of an example report in a gap assessment format, showing advocacy scores of various attributes at the brand level, in accordance with an embodiment of the present invention.

In one embodiment, the gap assessment format allows a user to compare consumer feedback for products or services side-by-side or against the industry as a whole. The user can compare feature and attribute ratings against a benchmark group of competitors, i.e., what competitors are delivering. FIG. 13 is a screenshot of an example report in the gap assessment format, showing advocacy scores of various attributes at the brand level.

Figure 14:
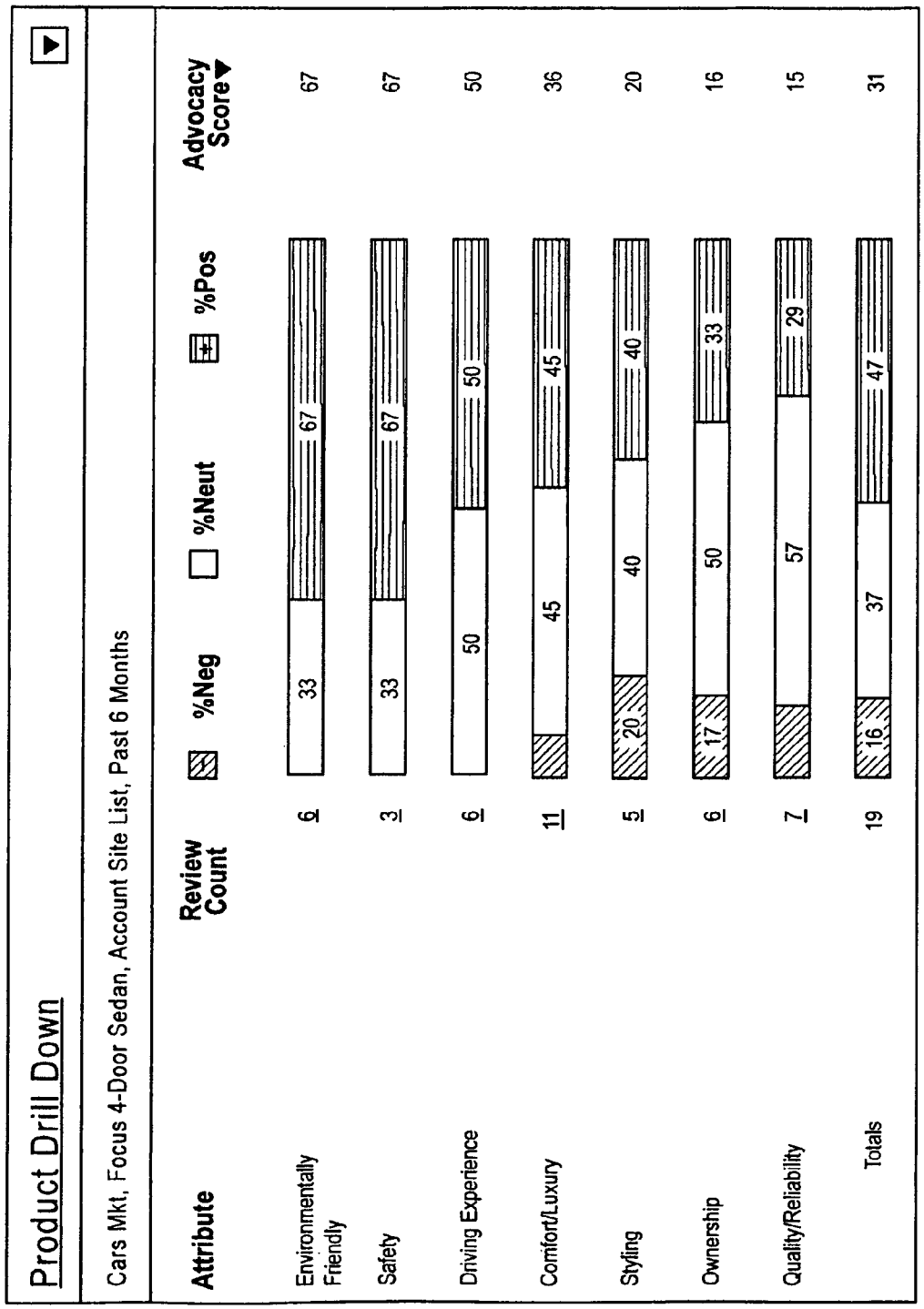
FIG. 14 is a screenshot of an example report in a product drill down format, showing (by attribute for the Focus 4-Door Sedan over six months) the number of reviews; the percentage of positive, negative and neutral reviews; and advocacy scores, in accordance with an embodiment of the present invention.

In one embodiment, the product drill down format allows a user to drill down to the attribute level of a product or service. A user can compare attribute advocacy scores of a product or service over time and to those of competing product or service. FIG. 14 is a screenshot of an example report in the product drill down format, showing (by attribute for the Focus 4-Door Sedan over six months) the number of reviews; the percentage of positive, negative and neutral reviews; and the advocacy scores.

Figure 15:
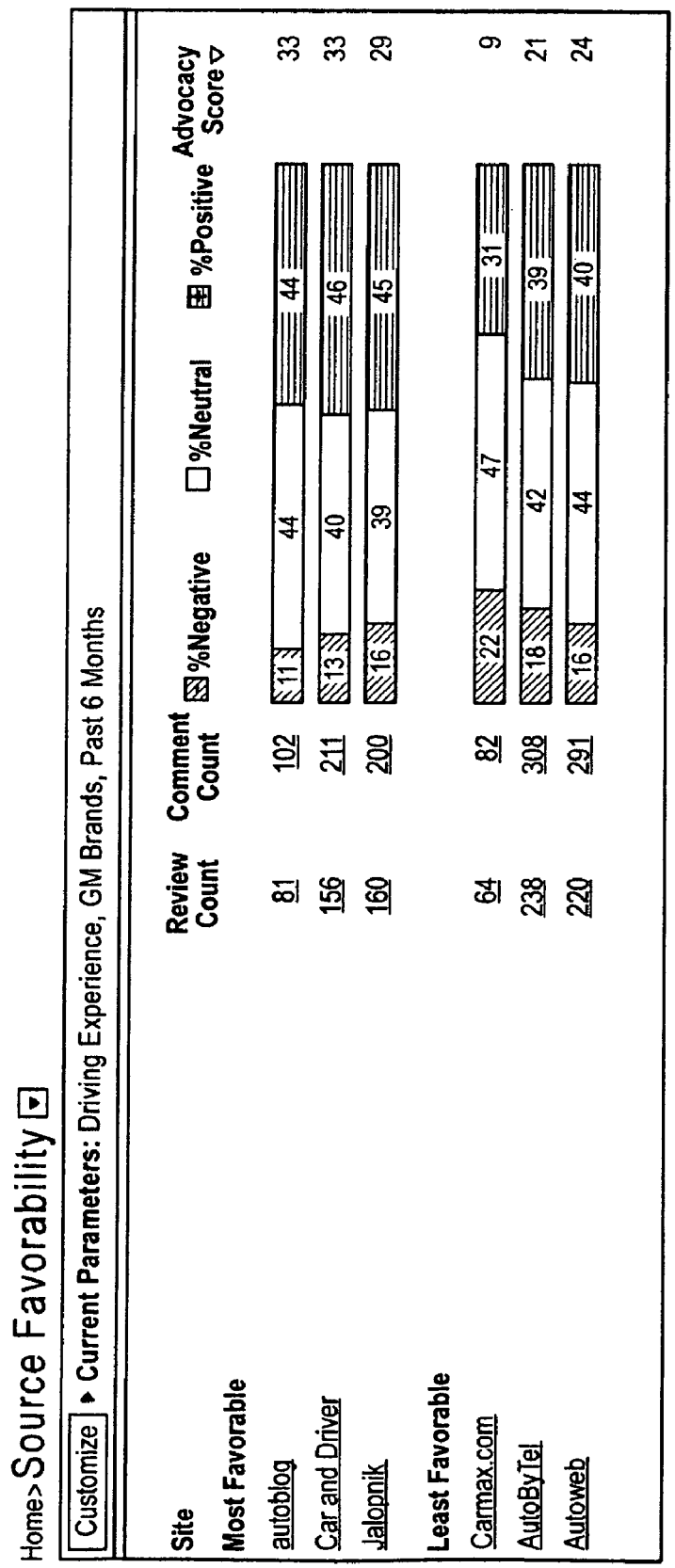
FIG. 15 is a screenshot of an example report in a source favorability format, showing (by website for the driving experience attribute of GM brands over six months) the number of reviews; the number of individual comments; the percentage of positive, negative and neutral reviews; and advocacy scores, in accordance with an embodiment of the present invention.

In one embodiment, the source favorability format displays the three (can be more or less) most favorable and three least favorable websites for an individual brand, product, or service. The source favorability format may alternatively be configured to display more than three or less than three websites. FIG. 15 is a screenshot of an example report in the source favorability format, showing (by website for the driving experience attribute of GM brands over six months) the number of reviews; the number of individual opinions; the percentage of positive, negative and neutral reviews; and the advocacy scores.

Figure 16:
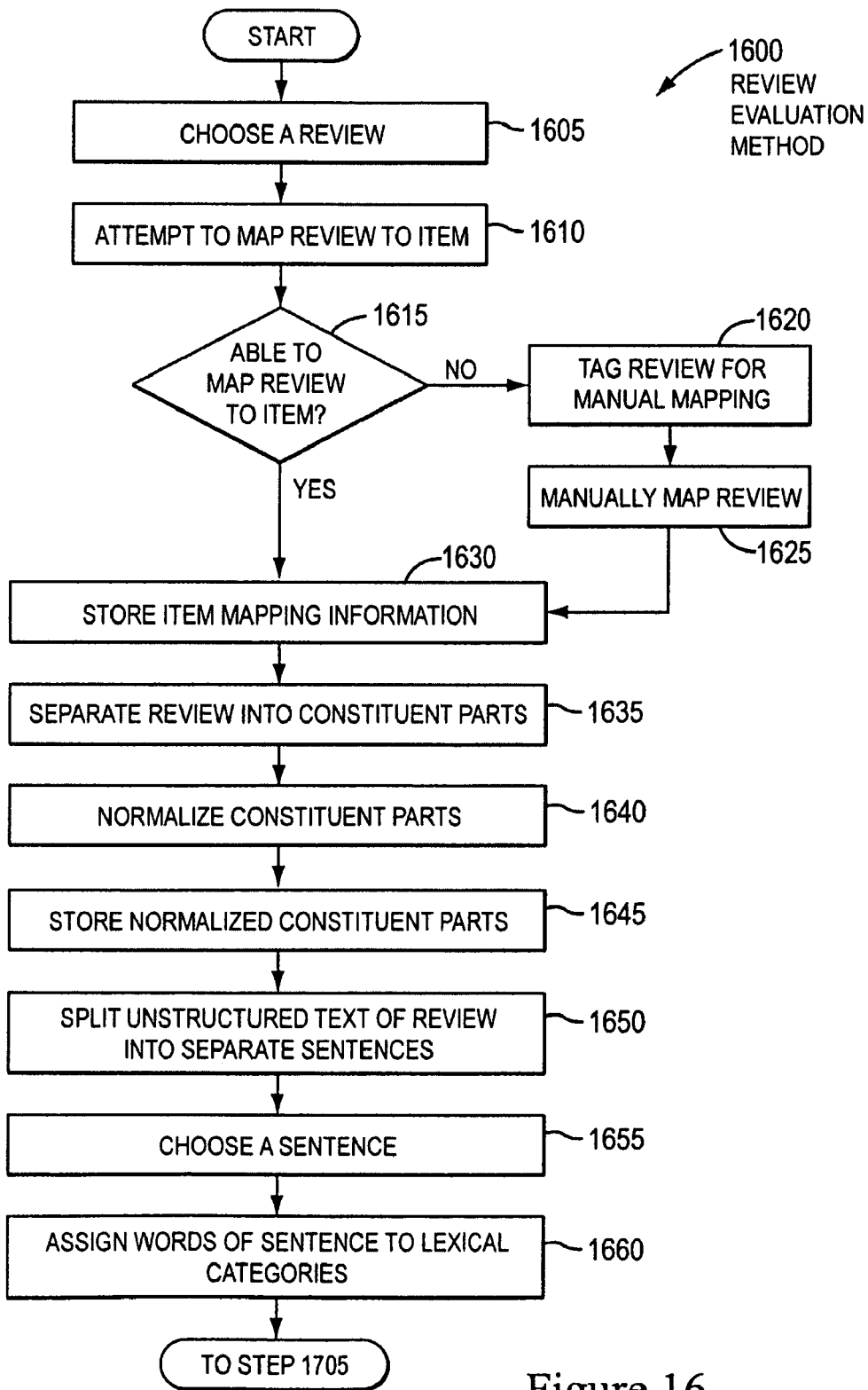
FIG. 16 is a flowchart of a first part of a review evaluation method, in accordance with an embodiment of the present invention.
Figure 17:
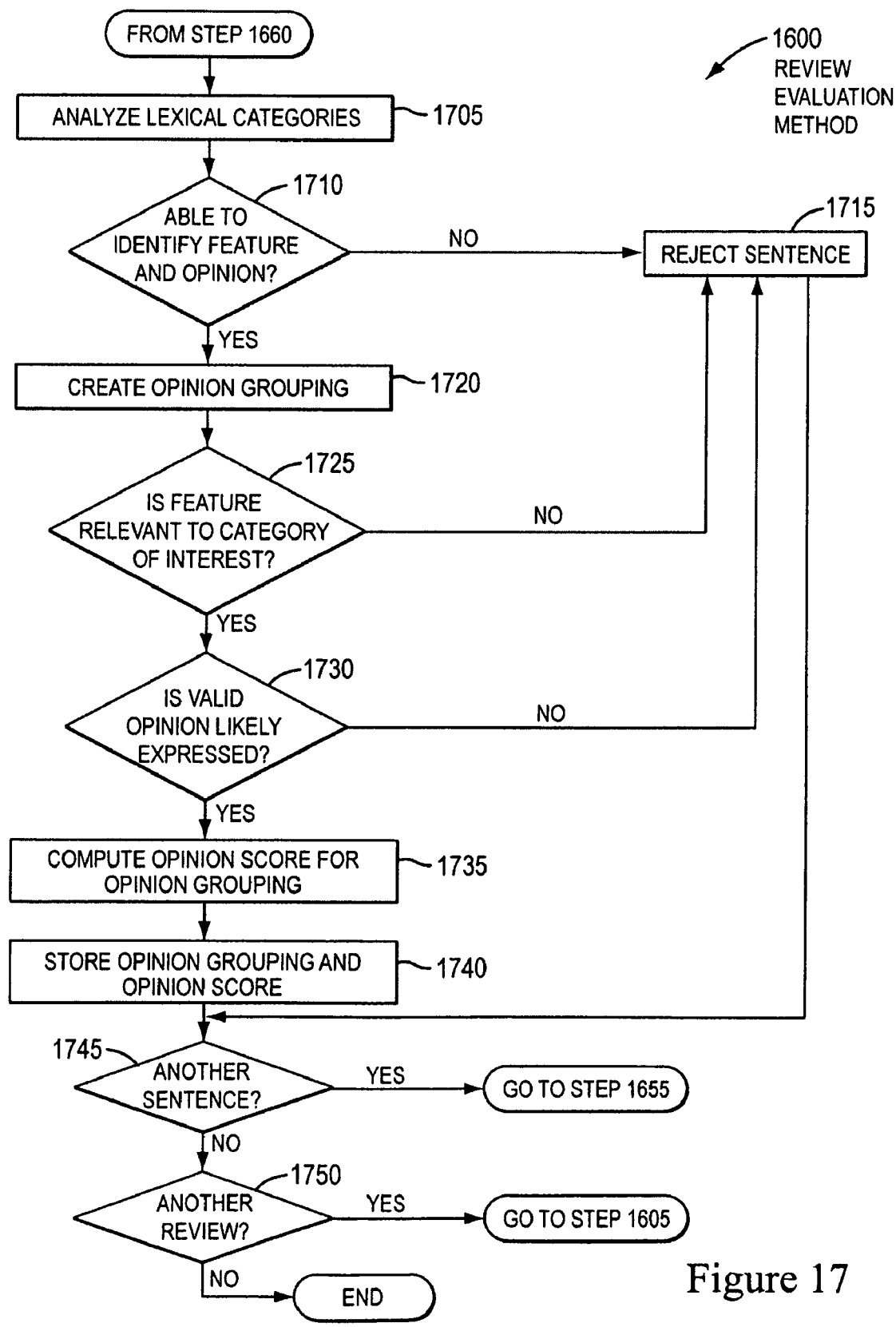
FIG. 17 is a flowchart of a second part of a review evaluation method, in accordance with an embodiment of the present invention.

FIGS. 16 and 17 show a flowchart of a method 1600 of evaluating a scraped review, in accordance with an embodiment of the present invention. The method 1600 begins with the review mapper 802 in step 1605 choosing a scraped review to evaluate.

In step 1610, the review mapper 802 attempts to map the scraped review to a product, service or entity. As discussed above, the review mapper 802 first attempts to map the review to the lowest level of item, e.g., the particular model of a brand of product. If the review mapper 802 fails to identify the lowest level of item, then the review mapper 802 attempts to map the review to the item by working its way upward, e.g., by attempting to map the review to the make, the service class, the product family, and/or the like.

In step 1615, the review mapper 802 determines whether it was able to map the review to a product, service or entity. If the review mapper 802 was able to map the review, then the review evaluation method 1600 moves to step 1630. If the review mapper 802 was unable to map the review to an item, then the review mapper tags the review for manual mapping in step 1620. In step 1625, the user may manually add review mapping information via operator interface 804.

In step 1630, the review mapper 802 adds the item mapping information, whether determined by the review mapper or manually added by the user, as metadata 920 to the review database 910.

In step 1635, the product mapper 806 separates the review into constituent parts (e.g., ratings, author, website address, publication date, etc.). In step 1640, the normalizer tool 808 normalizes the constituent parts to a predetermined format, to the extent that the constituent parts are amenable to such normalization. In step 1645, the normalizer tool 808 stores the normalized constituent parts as part of the metadata 920 in the review database 915.

In step 1650, the sentence splitter 810 separates at least a portion of the unstructured text of the review into one or more separate sentences (or other segments), each sentence (or other segment) comprising one or more words. In step 1655, the sentence parser 812 chooses a sentence to parse and, in step 1660, assigns one or more of the words of the sentence to lexical categories or parts of speech, e.g., adjectives, adverbs, articles, conjunctions, interjections, nouns, numbers, prepositions, pronouns, quantifiers, verbs, etc. Step 1660 may further comprise the step of providing data linking the one or more words of the sentence (or other segment) to the lexical categories to which the one or more words are customarily assigned in a dictionary.

In step 1705 (FIG. 17), the information extractor 816 analyzes the lexical categories assigned by the sentence parser 812 to attempt to identify the feature words, opinion words, and any rating modifiers contained in the chosen sentence. The information extractor 816 may attempt to identify the feature, opinion, and any rating modifiers all at the same time, or may attempt to identify the feature, opinion, and any rating modifiers serially (i.e., the information extractor first identifies the feature, then the opinion, and then any rating modifiers). In attempting to identify the feature, opinion, and any rating modifiers, the information extractor 816 may consult a training model 818, as discussed above. The training model 818 may provide a set of sample sentences (or other segments) and corresponding trained structures to assist in identifying feature words, opinion words, and rating modifiers.

In step 1710, the information extractor 816 determines whether it was able to identify at least a feature and an opinion in the chosen sentence. If the information extractor 816 was able to identify at least a feature and an opinion, then the information extractor creates an opinion grouping in step 1720, and the review evaluation method 1600 goes to step 1725. If the information extractor 816 was unable to identify at least a feature and an opinion, then the information extractor 816 rejects the sentence in step 1715, and the review evaluation method 1600 goes to step 1745.

In step 1725, the nonsense analyzer 820 determines whether the opinion grouping likely pertains to a feature that is relevant to the category of interest. If the nonsense analyzer 820 determines that the opinion grouping likely pertains to a feature that is relevant, then the review evaluation method 1600 goes to step 1730. If the nonsense analyzer 820 determines that the opinion grouping likely pertains to a feature that is irrelevant, then the nonsense analyzer rejects the sentence in step 1715, and the review evaluation method goes to step 1745.

In step 1730, the nonsense analyzer 820 determines whether, based upon the opinion grouping, the chosen sentence likely expresses a valid opinion. If the nonsense analyzer 820 determines that the sentence likely expresses a valid opinion, then the review evaluation method 1600 goes to step 1735. If the nonsense analyzer 820 determines that the sentence likely fails to express a valid opinion, then the nonsense analyzer 820 rejects the sentence in step 1715, and the review evaluation method 1600 goes to step 1745.

In step 1735, the sentiment rating engine 822 calculates an opinion score based upon the opinion grouping. In computing the opinion score, the sentiment rating engine 822 may consult the modifier tool 824, as discussed above. The modifier tool 824 may assign word scores to the feature word, opinion word, and any rating modifiers contained in the opinion grouping. In step 1740, the sentiment rating engine 822 stores the opinion grouping and opinion score as part of the metadata 920 in the review database 915.

In step 1745, the evaluation and presentation system 800 determines whether there is another sentence in the review to analyze. If so, then the review evaluation method 1600 returns to step 1655. Otherwise, the review evaluation method 1600 goes to step 1750.

In step 1750, the evaluation and presentation system 800 determines whether there is another review to map. If so, then the review evaluation method 1600 returns to step 1605. Otherwise, the review evaluation method 1600 ends.

Figure 18:
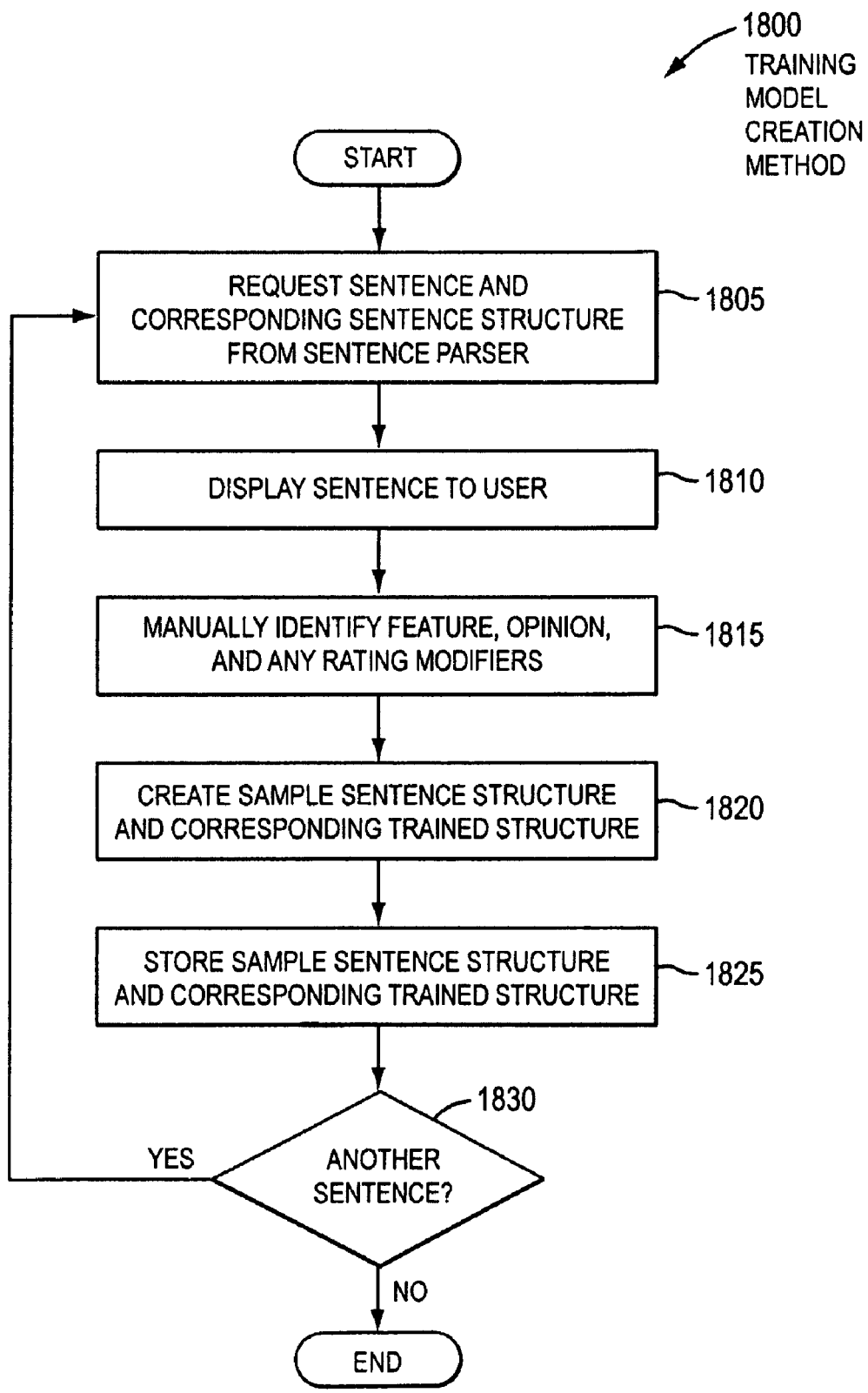
FIG. 18 is a flowchart of a training model creation method, in accordance with an embodiment of the present invention.

FIG. 18 is a flowchart of a method 1800 of creating a set of sample sentence structures and a set of corresponding trained structures for the training model 818, in accordance with an embodiment of the present invention.

The method 1800 begins in step 1805 with the modifier training module 1005 requesting a sentence and corresponding sentence structure from the sentence parser 812. In step 1810, the modifier training module 1005 displays the sentence to the user on an output device, such as the output device 415. By using an input device such as the input device 410, the user in step 1815 manually identifies the words in the sentence that correspond to a feature, an opinion, and any rating modifiers.

In step 1820, the training model creation module 1010 creates a sample sentence structure and a corresponding trained structure for the training model 818, based upon the user input and sentence structure received from the sentence parser 812. In step 1825, the training model creation module 1010 stores the sample sentence structure and corresponding trained structure in the training model database 945.

In step 1830, the modifier training module 1005 determines whether there is another sentence to train. If so, then the training model creation method 1800 returns to step 1805. Otherwise, the training model creation method 1800 ends.

Figure 19:
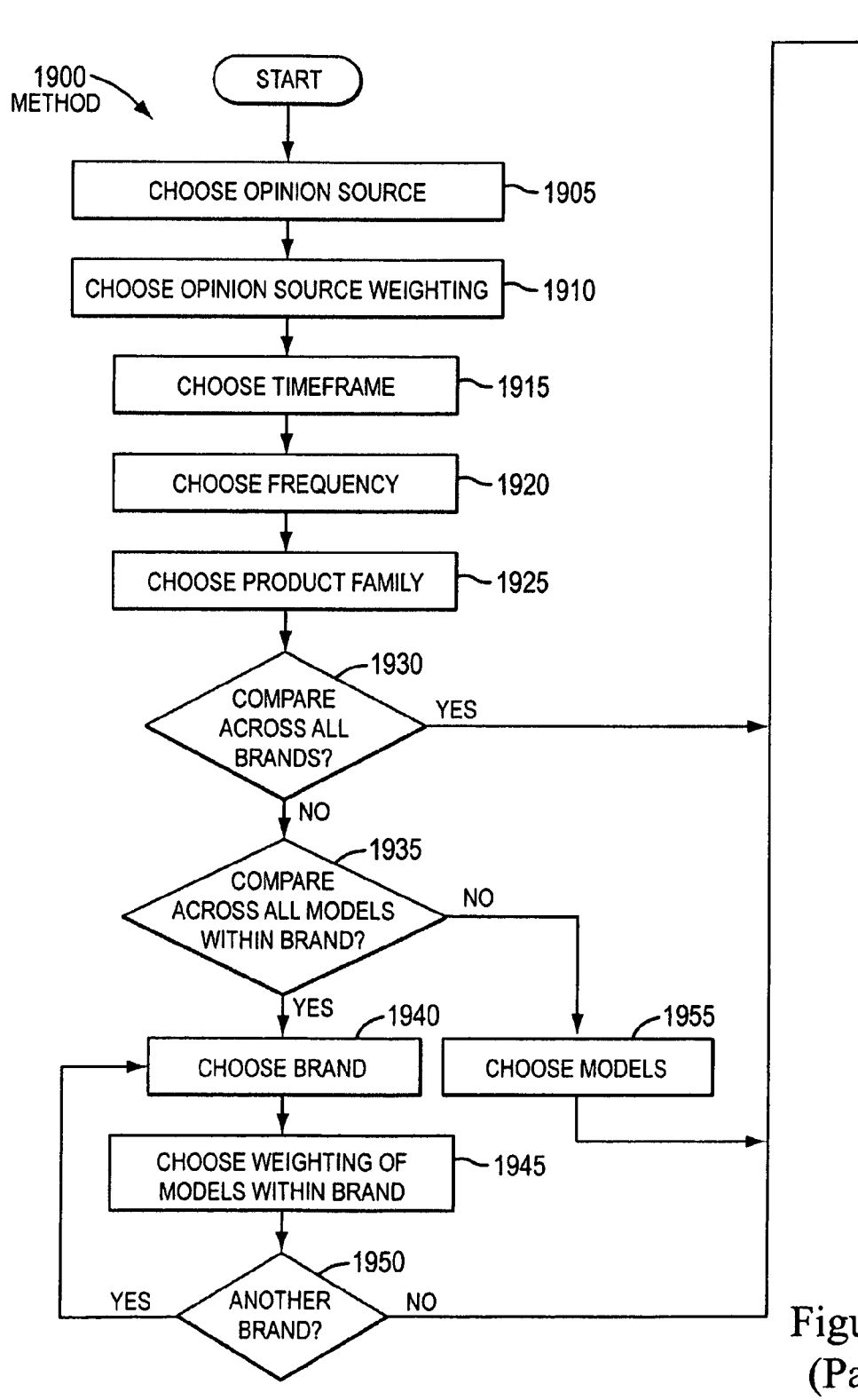
FIG. 19 is a flowchart of a method of creating a chart to be graphically and/or textually displayed to a user on an output device, in accordance with an embodiment of the present invention.
Figure 19:
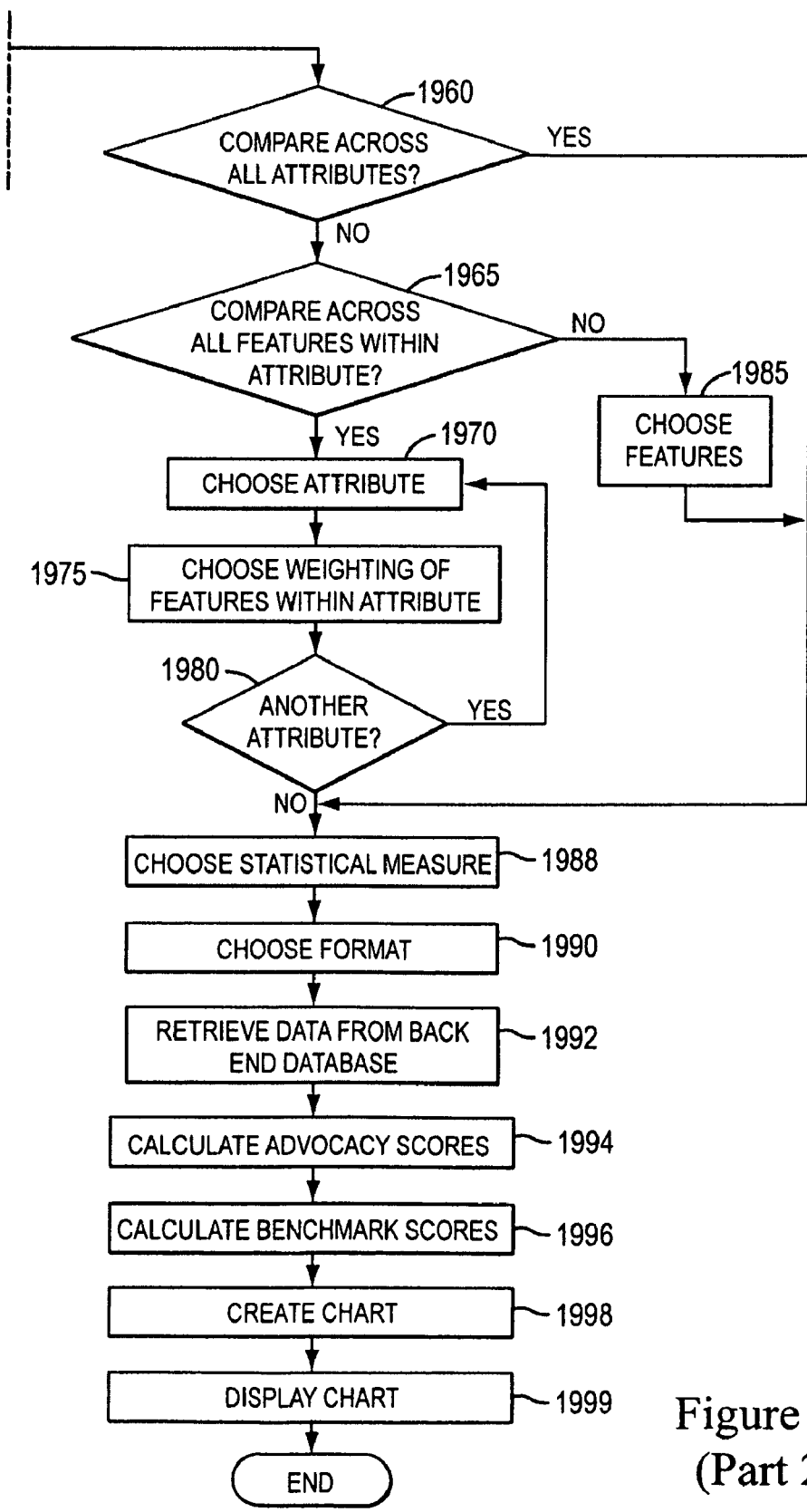

FIG. 19 is a flowchart of a method 1900 of creating a chart to be graphically and/or textually displayed to a user on an output device, in accordance with an embodiment of the present invention.

In step 1905, the user chooses a set of opinion sources over which opinions are to be measured. In one embodiment, the user may choose from a menu of choices including all opinion sources, opinion sources by type of opinion source (e.g., blogs, message boards, auction sites, consumer review sites, expert sites, traditional media sites, etc.), opinion sources having an impact metric greater than a certain value, opinion sources having an impact metric less than a certain value, opinion sources having an impact metric between certain values, opinion sources having an impact metric equal to a certain value, a customized list of opinion sources previously created by the user, and manual identification of opinion sources.

In step 1910, the user chooses the weighting of the opinion sources. In one embodiment, the user may choose from a menu of choices including no weighting, weighting by impact metric, a customized weighting previously created by user, and a manual identification of relative weights.

In step 1915, the user chooses a timeframe over which opinions are to be measured. In one embodiment, the user may choose from a menu of choices including measurement over the past week, over the past month, over the past year, over the past decade, before a certain date, after a certain date, between certain dates, and on a certain date.

In step 1920, the user chooses a frequency by which opinions are to be measured. In one embodiment, the user may choose from a menu of choices including measurement by day, week, month, or year.

In step 1925, the user chooses a product family or brand or product within which opinions are to be measured. In one embodiment, the user may choose from a menu of product family, brand or product choices.

In step 1930, the opinion insight summarizer 826 asks the user whether the user wants to make a comparison across all brands. If the user chooses to make a comparison across all brands, then the method 1900 continues to step 1960. Otherwise, the method 1900 continues to step 1935.

In step 1935, the opinion insight summarizer 826 asks the user whether the user wants to make a comparison across all models within a set of brands. If the user chooses to make a comparison across all models within a set of brands, then the user chooses a brand to compare in step 1940. In one embodiment, the user may choose from a menu of brands. In step 1945, the user chooses the weighting of the models within the chosen brand. In one embodiment, the user may choose from a menu of choices including no weighting, weighting by sales volume, weighting by sales revenue, a customized weighting previously created by user, and a manual identification of relative weights. In step 1950, the opinion insight summarizer 826 asks the user whether wants to choose another brand to compare. If yes, then the method 1900 returns to step 1940. Otherwise, the method 1900 continues to step 1960.

If the user chooses not to make a comparison across all products/services within a set of brands in step 1935, then opinion insight summarizer 826 asks the user to choose a set of models to compare in step 1955. In one embodiment, the user may choose from a menu of models. After the user has chosen a set of models, the method 1900 continues to step 1960.

In step 1960, the opinion insight summarizer 826 asks the user whether the user wants to make a comparison across all attributes applicable to the chosen product family. If the user chooses to make a comparison across all attributes, then the method 1900 continues to step 1988. Otherwise, the method 1900 continues to step 1965.

In step 1965, the opinion insight summarizer 826 asks the user whether the user wants to make a comparison across all features within a set of attributes. If the user chooses to make a comparison across all features within a set of attributes, then the user chooses an attribute to compare in step 1970. In one embodiment, the user may choose from a menu of attributes. In step 1975, the user chooses the weighting of the features within the chosen attribute. In one embodiment, the user may choose from a menu of choices including no weighting, a customized weighting previously created by user, and a manual identification of relative weights. In step 1980, the opinion insight summarizer 826 asks the user whether wants to choose another attribute to compare. If yes, then the method 1900 returns to step 1970. Otherwise, the method 1900 continues to step 1988.

If the user chooses not to make a comparison across all features within a set of attributes in step 1965, then opinion insight summarizer 826 asks the user to choose a set of features to compare in step 1985. In one embodiment, the user may choose from a menu of features. After the user has chosen a set of features, the method 1900 continues to step 1988.

In step 1988, the user chooses a statistical measure to be applied to the opinion scores corresponding to the chosen set of opinion sources, timeframes, brands, models, attributes, features, etc (the "chosen set"). In one embodiment, the user may choose from a menu of statistical measures, an arithmetic mean, a geometric mean, a mode, or a median.

In step 1990, the user chooses a format for a chart to be created by the presentation engine 830. In one embodiment, the user may choose from a menu of formats, including a chart showing net advocacy scores corresponding to the chosen set; a chart showing the percentage of positive opinion scores corresponding to the chosen set; and a chart showing the percentage of negative opinion scores corresponding to the chosen set. In another embodiment, the user may choose from a menu of predefined formats, including the customer advocacy trend format, a feature analyzer format, a gap assessment format, a product drill down format, and a source favorability format.

In step 1992, the opinion insight summarizer 826 and/or feature/attribute management tool 828 retrieve data corresponding to the chosen set and chosen format from the website impact metric 315, information extractor 816, sentiment rating engine 822, back end database 905, and/or other components described above. Depending upon the choices made by the user, the opinion insight summarizer 826 may retrieve data regarding relative weightings and which attributes comprise which features from the feature/attribute management database 970. The opinion insight summarizer may also retrieve data regarding brand weighting from the brand database 975 and data regarding opinion source weighting from the website impact metric 315.

For a subset of the chart formats, such as the feature analyzer format and the source favorability format, the opinion insight summarizer 826 may retrieve data regarding the number of reviews corresponding to the chosen set (the "review count") and the number of individual opinions contained in the reviews (the "opinion count"). For another subset of the chart formats, such as the product drill down format, the opinion insight summarizer 826 may retrieve data ranking the relative importance of individual features and/or attributes, so that the individual features and/or attributes may be displayed in order of importance.

In step 1994, the opinion insight summarizer 826 calculates advocacy scores corresponding to the chosen set according to the chosen statistical measure. In step 1996, the opinion insight summarizer 826 calculates benchmark scores for the chosen product family or brand or product according to the chosen statistical measure. The user may choose a benchmark other than the chosen product family. For a subset of the chart formats, such as the feature analyzer format, the opinion insight summarizer 826 also calculates a set of benchmark scores for the individual chosen brands and/or products, indexed to a predefined number. FIG. 12, for example, shows a set of benchmark scores for the individual chosen brands (the "index to group"), indexed to the number 100.

In step 1998, the presentation engine 830 creates a chart based upon the calculated advocacy scores, calculated benchmark scores, and data retrieved in step 1992. In step 1999, the presentation engine graphically and/or textually displays the chart to a user on an output device, such as output device 415. The method 1900 then ends.

In one embodiment, some of the steps of the method 1900 may be skipped, depending upon the chart format that the user wants. For example, step 1920, wherein the user chooses a frequency by which opinions are to be measured, may be skipped for the feature analyzer, gap assessment, product drill down, and source favorability formats, which provide advocacy scores and/or benchmark scores for a single fixed time period defined by the user.

In another embodiment, step 1990, wherein the user chooses a format for a chart to be created by the presentation engine 830, may be moved to the start of the method 1900. In this embodiment, choosing a format may cause the method 1900 to skip a certain set of steps depending upon the chosen format, so that the user is asked only for information relevant to the chosen format.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A system for evaluating a review having unstructured text, the system comprising:
   a processor;
   a segment splitter for separating at least a portion of the unstructured text into one or more segments, each segment comprising one or more words;
   a segment parser coupled to the segment splitter for assigning one or more lexical categories to one or more of the one or more words of each segment;
   an information extractor coupled to the segment parser for identifying, based on the one or more lexical categories, a feature word and an opinion word contained in the one or more segments; and
   a sentiment rating engine coupled to the information extractor for calculating an opinion score based upon an opinion grouping, the opinion grouping including at least the feature word and the opinion word identified by the information extractor, the opinion score based on a word score associated with the feature word or the opinion word identified by the information extractor.

2. The system of claim 1, further comprising a language engine coupled to the segment parser for providing the segment parser with data linking the one or more words of each segment to the lexical categories to which the one or more words are customarily assigned in a dictionary.

3. The system of claim 1, wherein the information extractor is configured to identify rating modifiers, the rating modifiers modifying the opinion word contained in the one or more segments.

4. The system of claim 1, further comprising a training model coupled to the information extractor for providing the information extractor with a set of sample segments and corresponding trained structures to assist in identifying feature words and opinion words.

5. The system of claim 1, further comprising a nonsense analyzer coupled to the sentiment rating engine for determining whether the opinion word is validly associated with the feature word of the opinion grouping.

6. The system of claim 5, wherein the nonsense analyzer is further configured to determine whether the opinion grouping duplicates an earlier opinion grouping.

7. The system of claim 1, further comprising a modifier tool coupled to the sentiment rating engine for assigning the word score.

8. The system of claim 1, further comprising an opinion insight summarizer coupled to the sentiment rating engine, wherein the sentiment rating engine calculates a plurality of opinion scores based upon a plurality of opinion groupings; and the opinion insight summarizer aggregates the plurality of opinion scores into one or more advocacy scores.

9. The system of claim 8, further comprising a feature/attribute management tool coupled to the opinion insight summarizer for assigning a relative weight to each of the plurality of opinion scores.

10. The system of claim 8, further comprising a presentation engine coupled to the opinion insight summarizer for presenting the one or more advocacy scores to a user on an output device.

11. A method for evaluating a review having unstructured text, the method comprising the steps of:
    separating at least a portion of the unstructured text into one or more segments, each segment comprising one or more words;
    assigning lexical categories to one or more of the one or more words of each segment;
    identifying, based on the lexical categories, a feature word and an opinion word contained in the one or more segments;
    calculating, using a processor, an opinion score based upon an opinion grouping, the opinion grouping including the feature word and the opinion word, the opinion score based on a word score associated with the feature word or the opinion word; and
    evaluating the feature word based, at least in part, on the opinion score.

12. The method of claim 11, wherein the step of assigning lexical categories further comprises the step of providing data linking the one or more words of each segment to the lexical categories to which the one or more words are customarily assigned in a dictionary.

13. The method of claim 11, wherein the step of identifying feature words and opinion words further comprises the step of identifying rating modifiers the rating modifiers modifying the opinion word contained in the one or more segments.

14. The method of claim 11, wherein the step of identifying feature words and opinion words further comprises the step of providing a set of sample segments and corresponding trained structures to assist in identifying feature words and opinion words.

15. The method of claim 11, wherein the step of calculating an opinion score further comprises the step of determining whether the opinion word is validly associated with the feature word of the opinion grouping.

16. The method of claim 11, wherein the step of calculating an opinion score further comprises the step of determining whether the opinion grouping duplicates an earlier opinion grouping.

17. The method of claim 11, wherein the step of calculating an opinion score further comprises the step of assigning the word score.

18. The method of claim 11, further comprising the steps of calculating a plurality of opinion scores based upon a plurality of opinion groupings; and aggregating the plurality of opinion scores into one or more advocacy scores.

19. The method of claim 18, wherein the step of aggregating the plurality of opinion scores further comprises assigning a relative weight to each of the plurality of opinion scores.

20. The method of claim 18, further comprising the step of presenting the one or more advocacy scores to a user on an output device.

* * * * *